July 30, 1935.  E. A. JOHNSTON  2,009,806
RECORD CONTROLLING MEANS
Filed May 9, 1929  10 Sheets-Sheet 1

Inventor
Edward A. Johnston
By Wilkinson, Huxley, Byron & Knight Attys

July 30, 1935.     E. A. JOHNSTON     2,009,806
RECORD CONTROLLING MEANS
Filed May 9, 1929     10 Sheets-Sheet 2
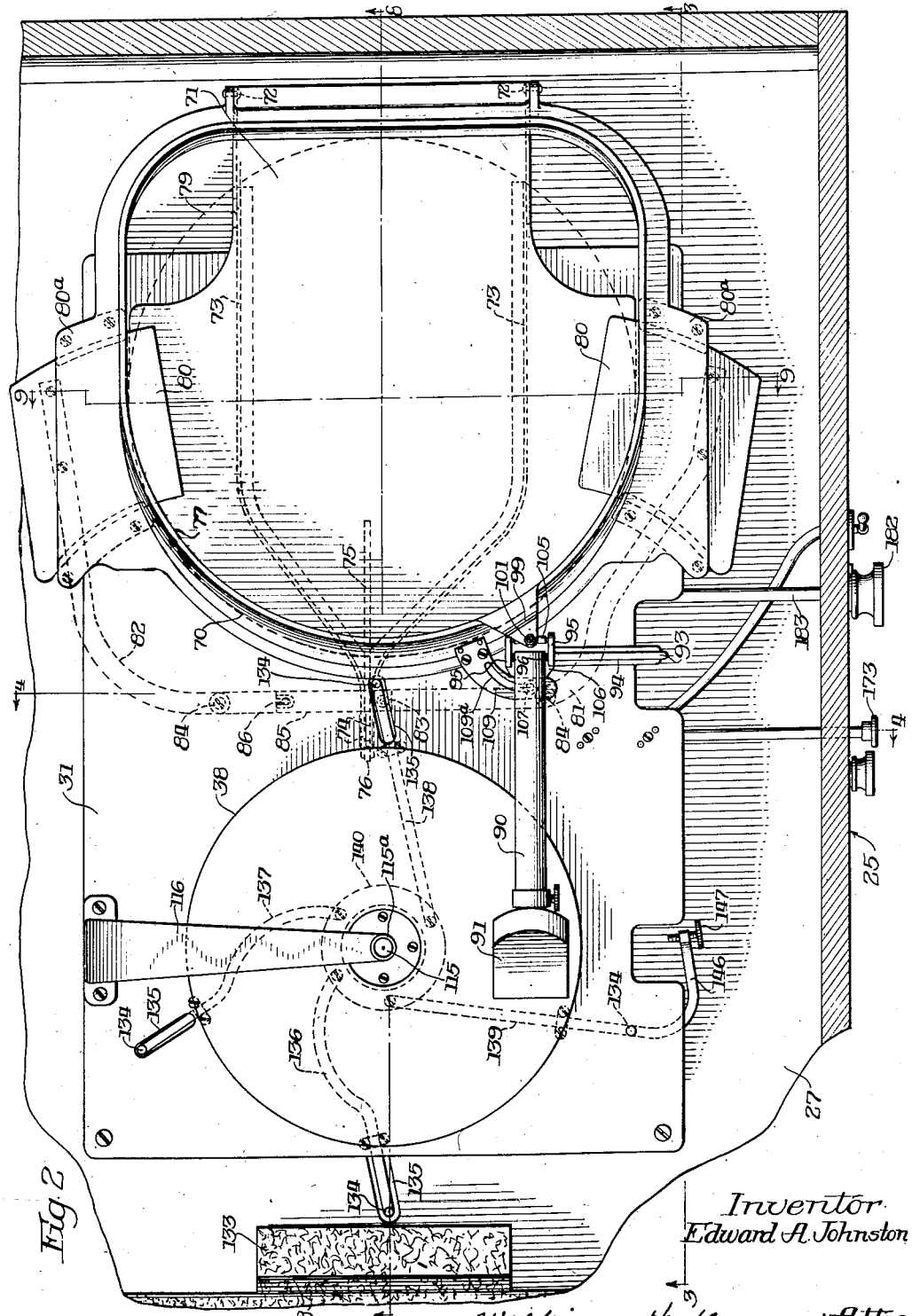
Inventor
Edward A. Johnston
By
Attys July 30, 1935.  E. A. JOHNSTON  2,009,806
RECORD CONTROLLING MEANS
Filed May 9, 1929   10 Sheets-Sheet 3
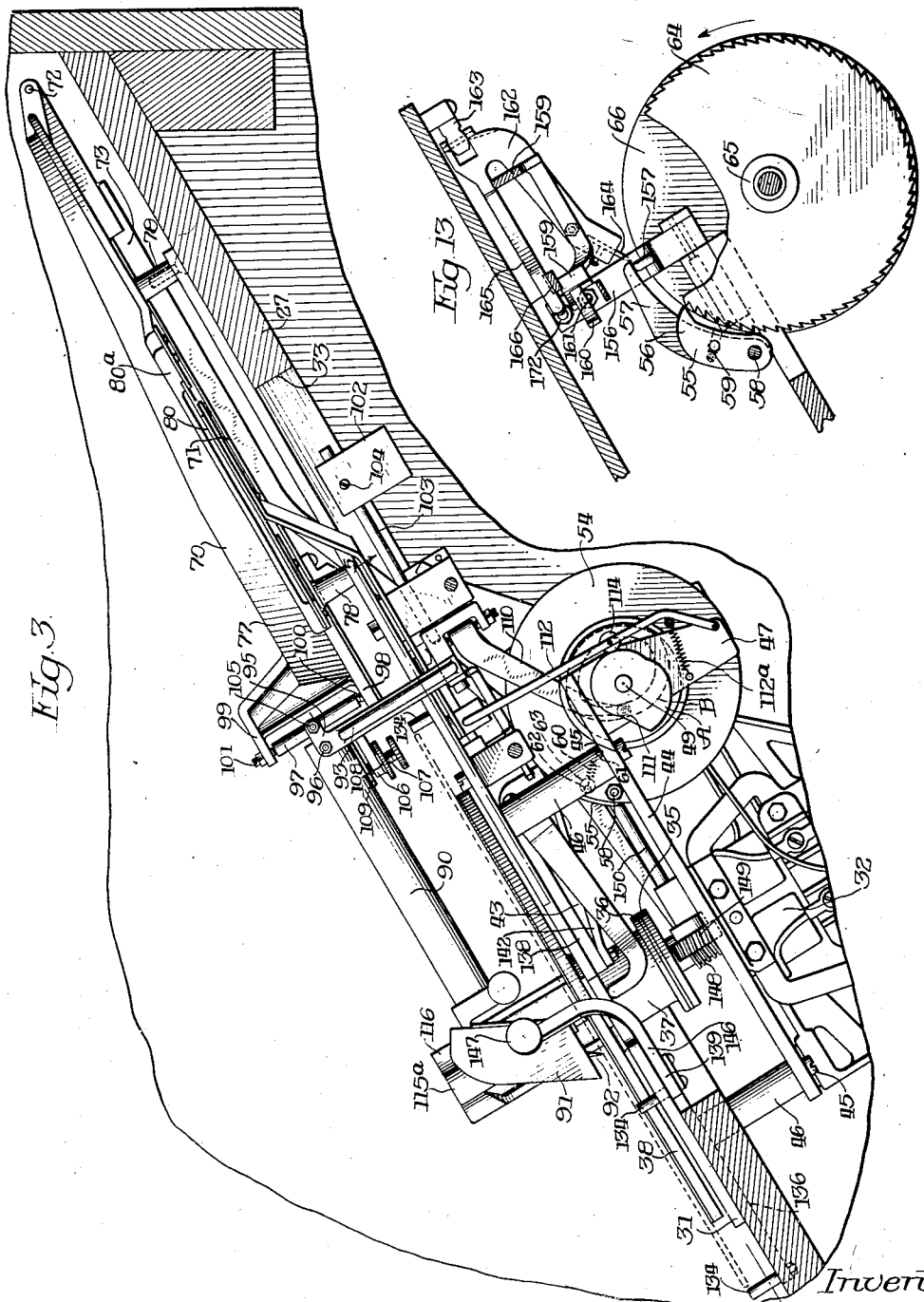
Inventor
Edward A. Johnston

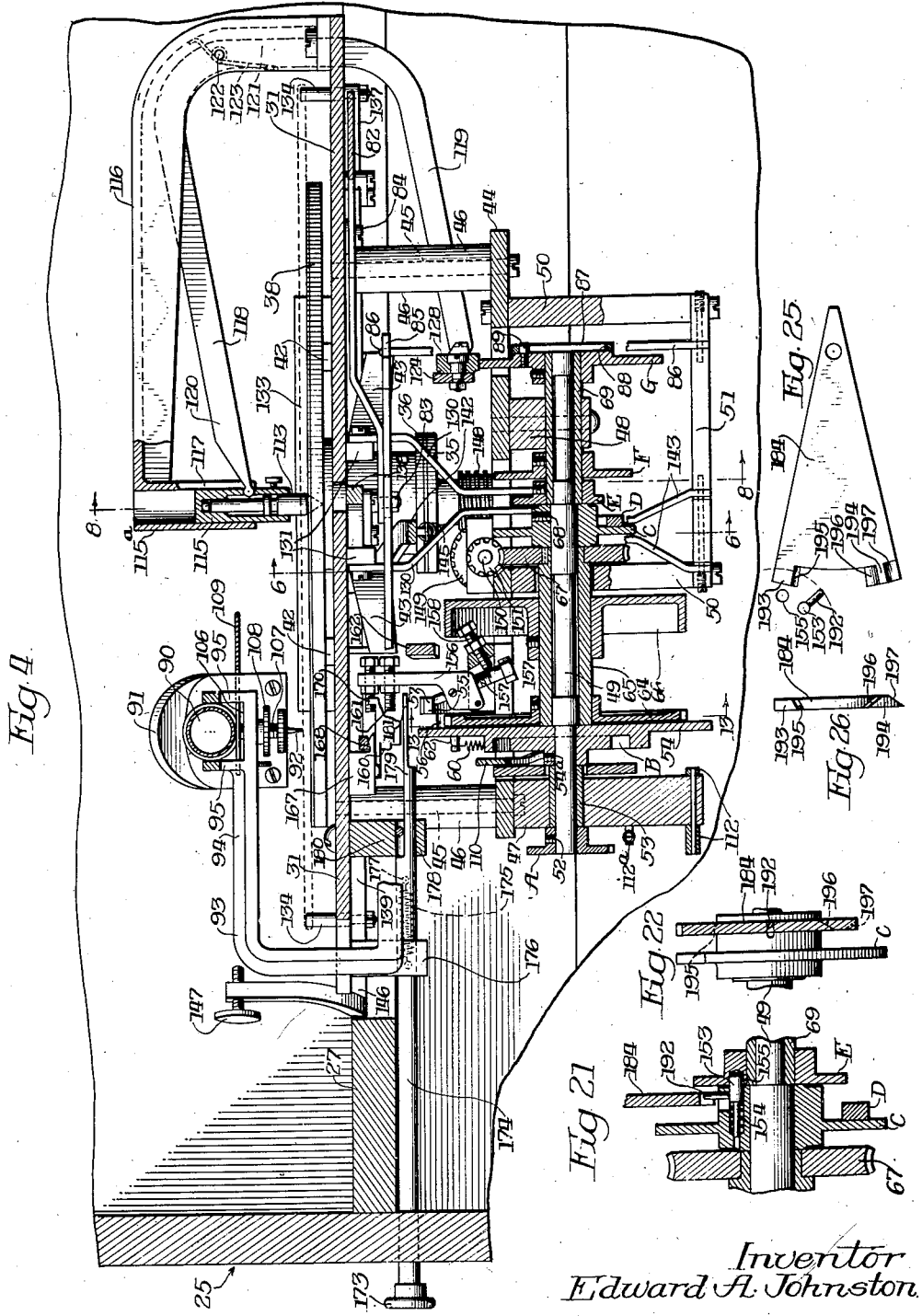

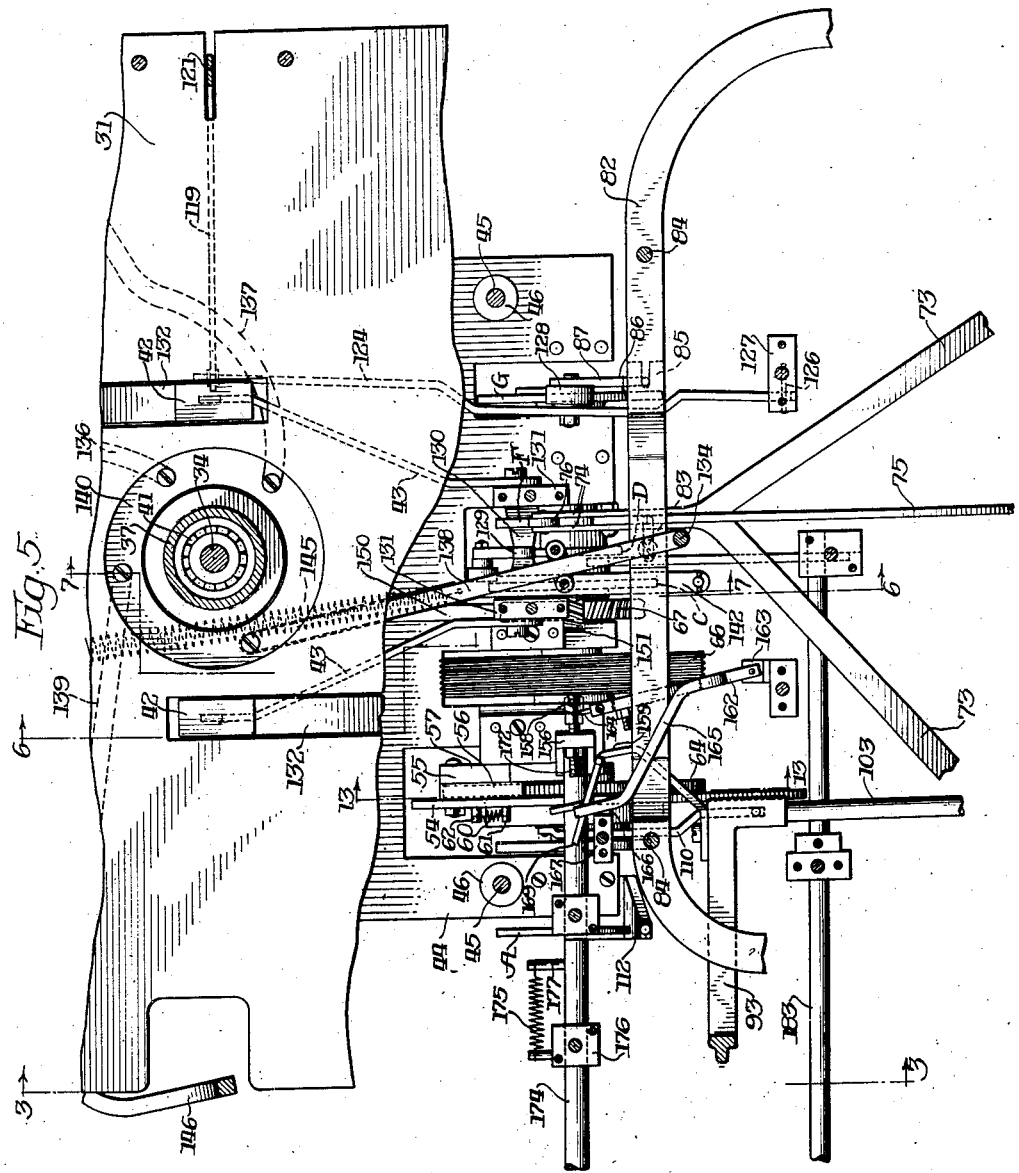

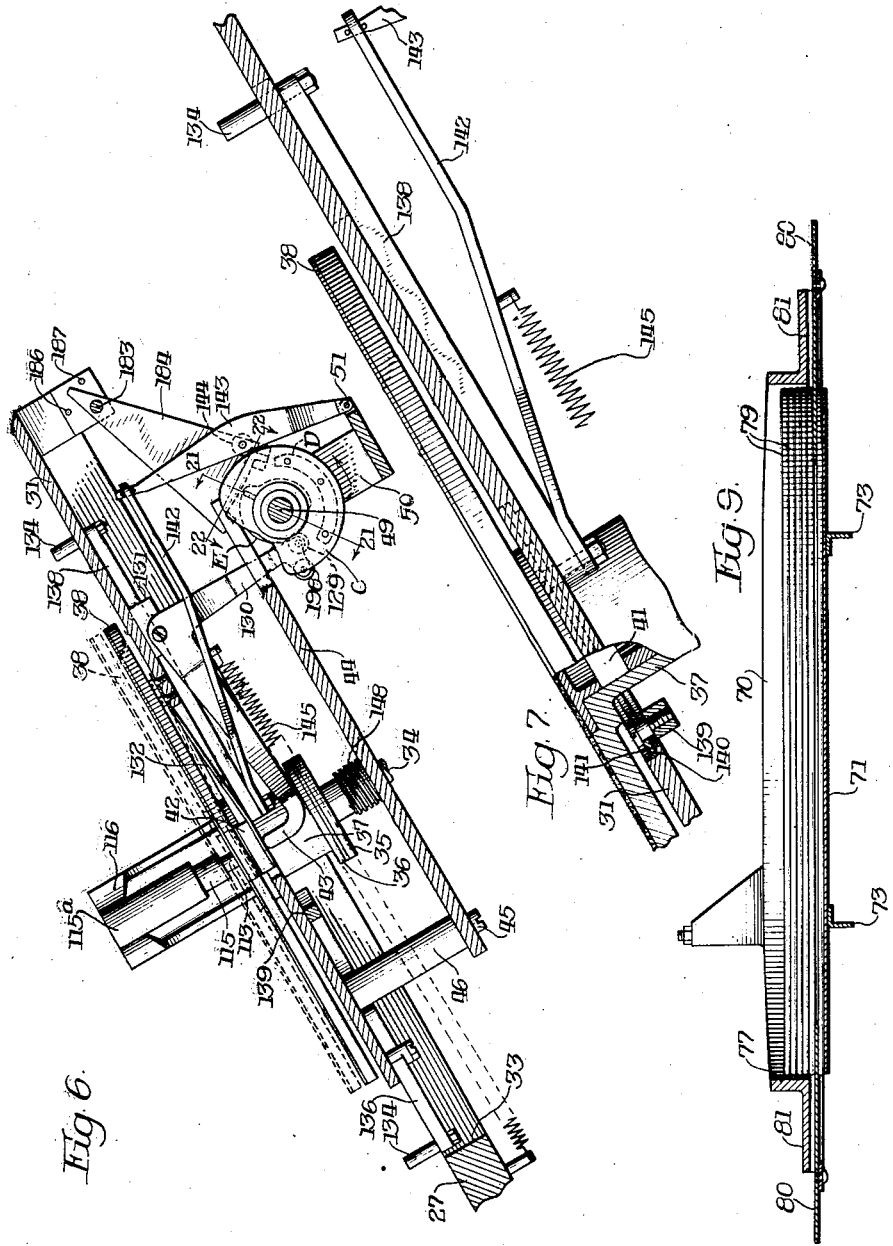

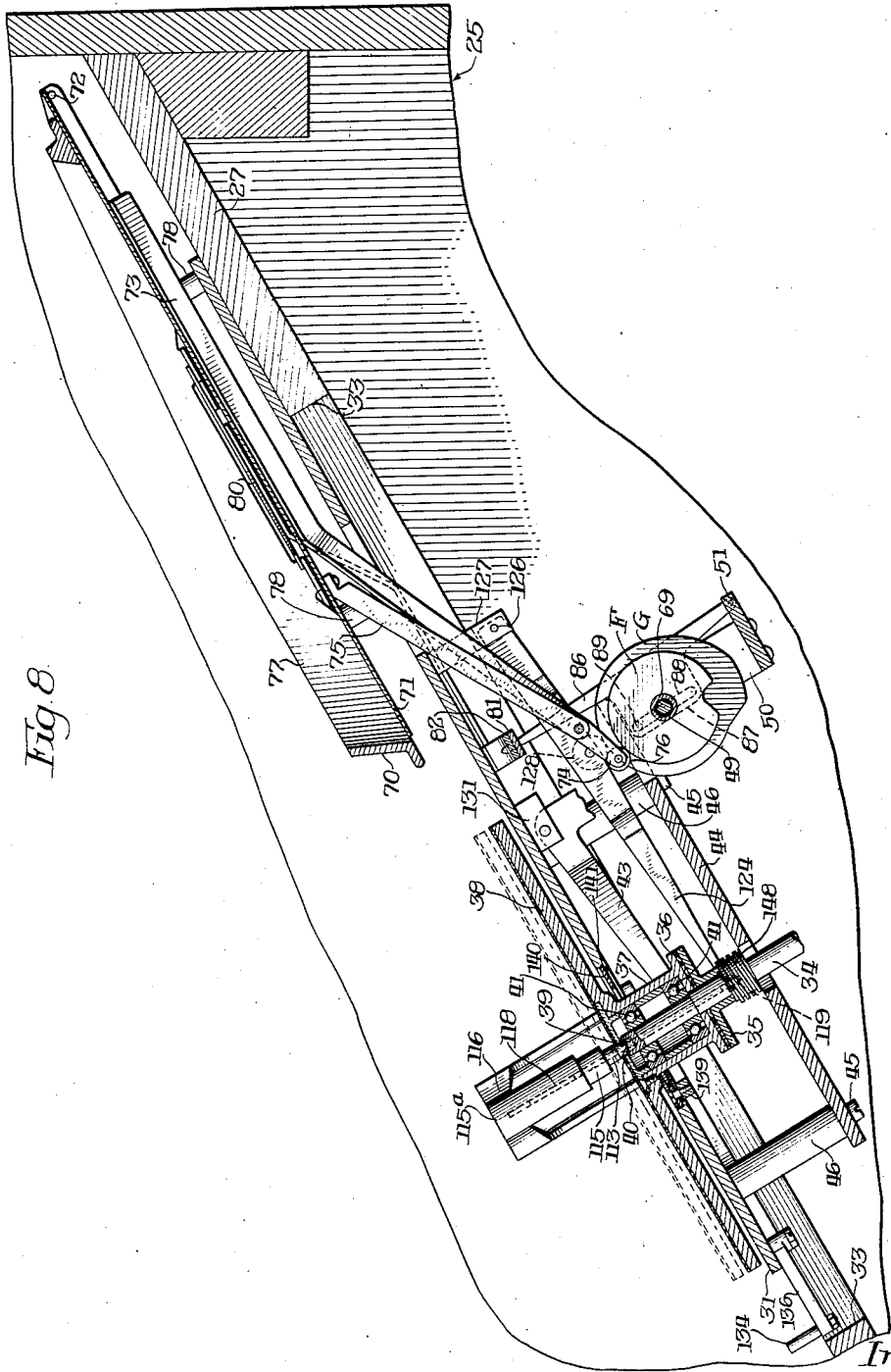

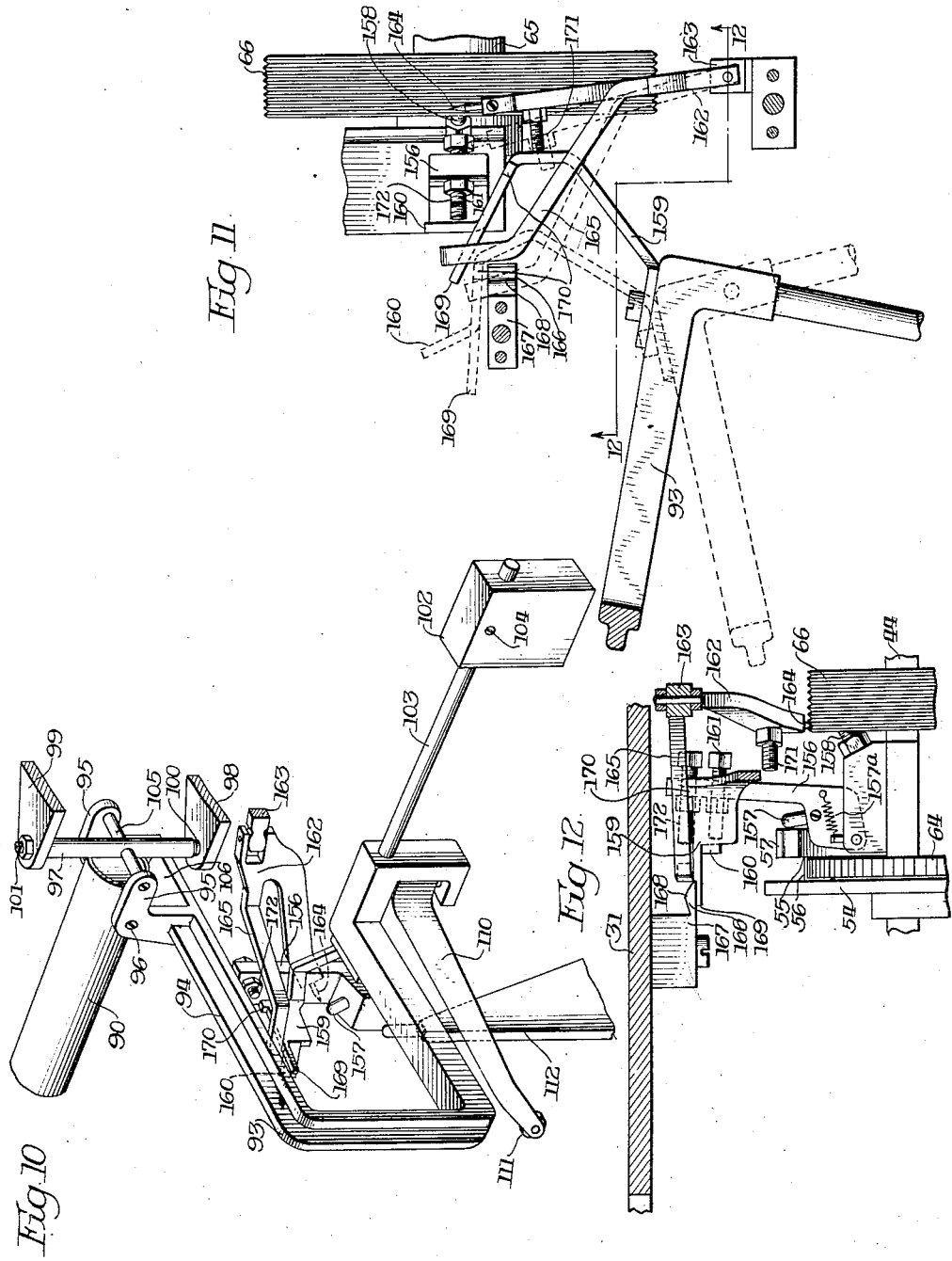
July 30, 1935.  E. A. JOHNSTON  2,009,806
RECORD CONTROLLING MEANS
Filed May 9, 1929   10 Sheets-Sheet 8
Inventor
Edward A. Johnston July 30, 1935.  E. A. JOHNSTON  2,009,806
RECORD CONTROLLING MEANS
Filed May 9, 1929  10 Sheets-Sheet 9
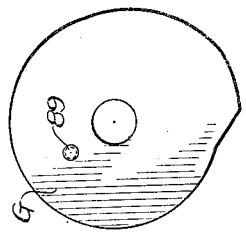
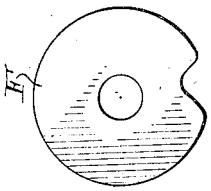
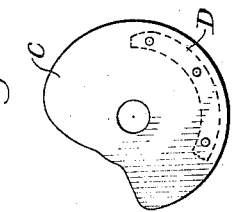
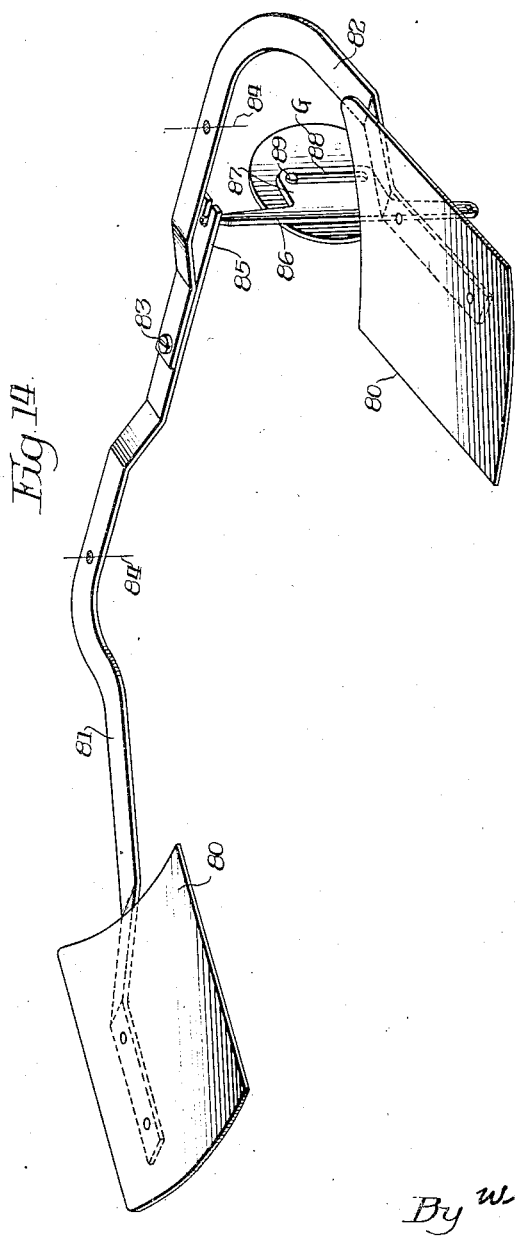
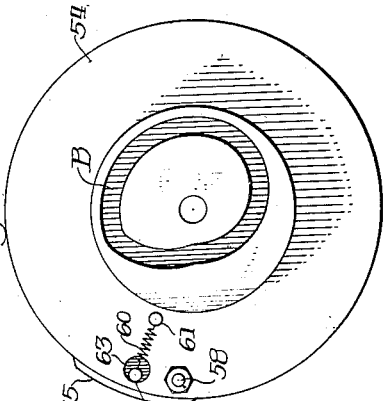
Inventor
Edward A. Johnston.
By Wilkinson, Huxley, Byron & Knight
Attys July 30, 1935.  E. A. JOHNSTON  2,009,806
RECORD CONTROLLING MEANS
Filed May 9, 1929    10 Sheets-Sheet 10

Inventor.
Edward A. Johnston.
By Wilkinson, Huxley,
Byron & Knight,  Attys

Patented July 30, 1935

2,009,806

UNITED STATES PATENT OFFICE 2,009,806

RECORD CONTROLLING MEANS

Edward A. Johnston, Chicago, Ill.

Application May 9, 1929, Serial No. 361,638

49 Claims. (Cl. 274—10)

The present invention relates to record controlling means.

More particularly the present invention relates to means for successively supplying records to the playing platen of a phonograph.

According to the present invention, a plurality of records may be placed in position in a phonograph and said records will be supplied in succession to the playing platen and successively discharged from said platen.

An object of the present invention is to provide a phonograph or an accessory for a phonograph which will handle records automatically in a safe manner, whereby rough handling of said records is avoided.

A further object is to provide a phonograph or an accessory therefor which will automatically handle a plurality of records in succession regardless of the size and type of said records so long as said records are disk records of commercial sizes and types.

A further object is to provide record controlling means for handling disk records which will automatically feed said records to the playing platen, start said platen in operation, and stop the platen at the end of a record regardless of differences in internal diameter of the playing groove and regardless of whether said playing groove terminates in a spiral, ellipse, or other shape, as found on commercial records for record stopping purposes.

A further object is to provide record controlling means for a phonograph which will automatically safely position a plurality of records successively upon the playing platen of said phonograph regardless of the size of said records within the limits of size at present encountered in commerce.

A further object is to provide record controlling means for successively feeding a plurality of records to a playing platen of a phonograph, which controlling means has the advantage that at the option of the operator any record may be repeated one or more times by a simple manipulation while the particular record is being played.

A further object, additional to the last mentioned object, is to provide a construction whereby the operator may reject any record while it is being played and automatically cause the controlling means to feed another record to the playing platen.

A further object is to provide record controlling means for a phonograph which will supply a plurality of records successively to the playing platen and discharge said records from said platen with a gravity feed.

A further object is to provide record controlling means which will handle a plurality of records in succession, causing said records to play to the full length of the playing groove, to stop the phonograph when the playing groove of said record has been completely traversed, to discharge said record and to supply another record to the playing platen regardless of the internal diameter of the playing grooves of said records and regardless of whether or not the record is equipped with the usual special record stopping groove as provided on certain phonograph records in common use.

A further object is to provide an improved phonograph having an inclined playing platen in which any tendency toward undue pressure by the playing needle of said phonograph against the side walls of the groove of the record being played will be prevented.

A further object is to provide a phonograph having a single motor for operating the various instrumentalities for controlling a plurality of records in succession, as above referred to, which phonograph so distributes the load on said motor that only a relatively small motor is required.

Further objects will appear as the description proceeds.

Referring to the drawings—

Figure 1 is a view in elevation, parts being broken away, showing a phonograph embodying the principles of the present invention;

Figure 2 is a sectional view taken along the planes indicated by the arrows 2—2 of Figure 1;

Figure 3 is a sectional view taken along the planes indicated by the arrows 3—3 of Figures 2 and 5;

Figure 4 is a sectional view taken along the planes indicated by the arrows 4—4 of Figure 2;

Figure 5 is a sectional view taken along the plane indicated by the arrows 5—5 of Figure 3;

Figure 6 is a sectional view taken along the planes indicated by the arrows 6—6 of Figures 4 and 5;

Figure 7 is a sectional view taken along the planes indicated by the arrows 7—7 of Figure 5;

Figure 8 is a sectional view taken along the planes indicated by the arrows 8—8 of Figures 2 and 4;

Figure 9 is a sectional view taken along the planes indicated by the arrows 9—9 of Figure 2;

Figure 10 is a perspective view illustrating a portion of the tone arm of a phonograph and mechanism associated therewith for controlling the records above referred to;

Figure 11 is a view on an enlarged scale of part of the mechanism shown in Figure 5;

Figure 12 is a sectional view taken along the planes indicated by the arrows 12—12 of Figure 11;

Figure 13 is a sectional view taken along the planes indicated by the arrows 13—13 of Figures 4 and 5;

Figure 14 is a perspective view of record separating mechanism forming part of the present invention whereby insurance is had that only one record at a time will be supplied to the playing platen;

Figure 15 illustrates a cam for operating the tone arm of the phonograph above referred to, which cam has the function of moving said tone arm outwardly away from the axis of a record upon the playing platen after said record has been played;

Figure 16 is a view of a disk for carrying pawl means for controlling a cam shaft, to be referred to in detail hereinafter, and also shows a cam groove for controlling the lifting and lowering of the tone arm to and from record playing positions;

Figure 17 represents a cam for controlling centering means for a record on the playing platen, and also shows cam means for eliminating danger of interference between said record and said centering means when the playing of said record is to be repeated;

Figure 18 shows a cam for controlling the driving connection between the motor and the platen;

Figure 19 illustrates a cam controlling the feed of records successively from a reservoir to the playing platen;

Figure 20 represents a cam for operating the center pin of the playing platen and for controlling means for separating the records in the reservoir preparatory to the supplying of one of said records from said reservoir to the playing platen;

Figure 21 is a sectional view taken along the plane indicated by the arrows 21—21 of Figure 6;

Figure 22 is a sectional view taken along the plane indicated by the arrows 22—22 of Figure 6;

Figures 23, 24, 25 and 26 illustrate mechanism operable to cause the repeating of the playing of a record.

Figures 1, 23, 24:
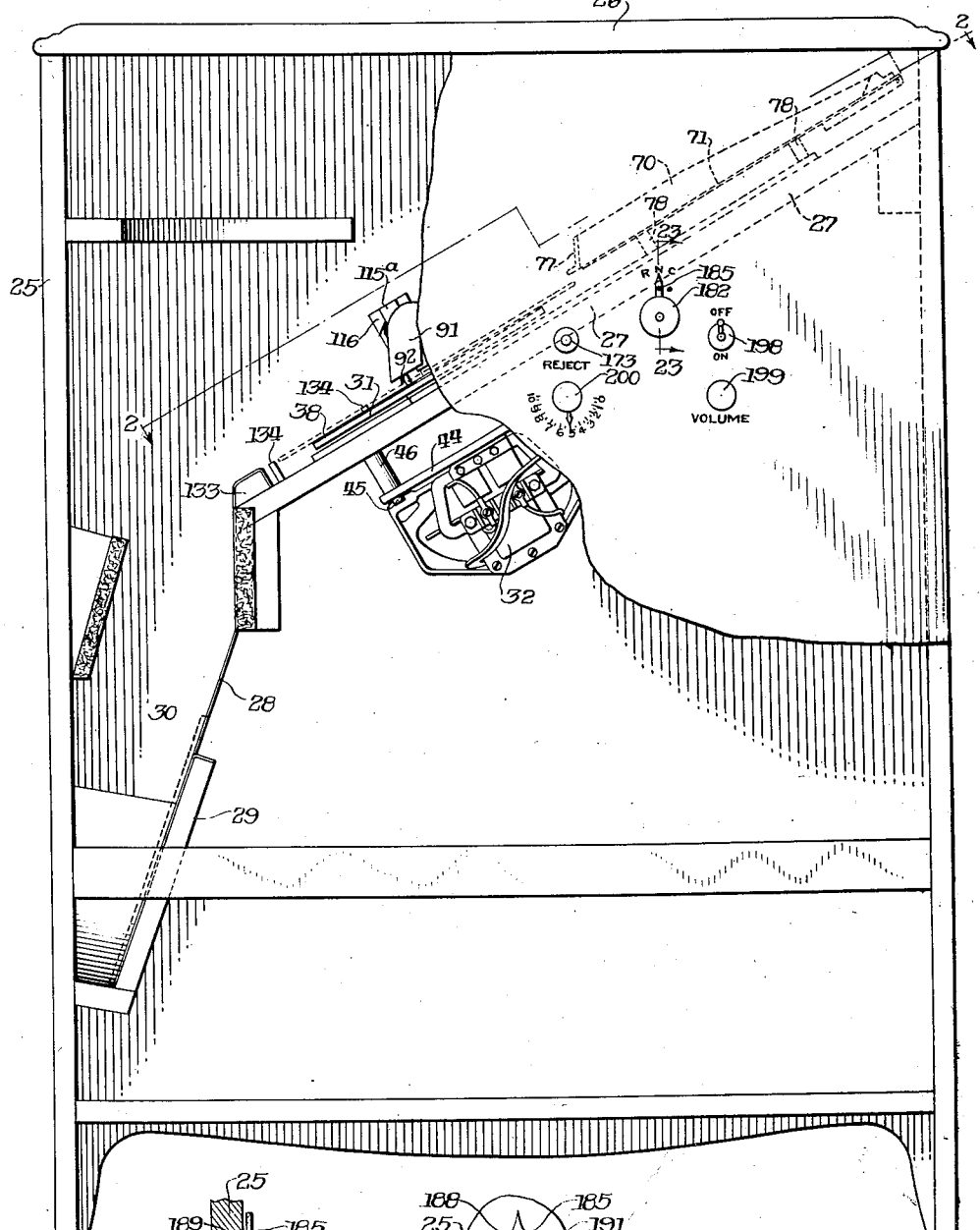

Before proceeding with a detailed description of the parts illustrated in the above mentioned figures, a short outline will be given of the functions performed by said parts.

The present invention contemplates structure which will occupy a minimum of space. A reservoir is provided for carrying a plurality of records, which records may be of practically any of the sizes within the limits encountered in practice at the present time. Records of certain well known manufacture have their playing grooves terminating in a sharp spiral for the purpose of cooperating with certain stop mechanism for stopping the playing platen when the record has been completely played. Other records of well known manufacture provide an elliptical groove at the inner terminus of the playing groove for cooperating with stop mechanism provided in certain phonographs. Other manufacturers provide grooves of other shapes for cooperation with particular stop mechanisms cooperating with the playing platen. Still other records, particularly those of older types, provide no particular contour at the terminus of the playing groove except that such records usually provide one or more complete circular turns for receiving the needle after said needle has completely traversed the playing groove. The present invention contemplates structure for handling records of all sizes now found in practice and records provided with the special grooves referred to hereinabove, or records which are not provided with any of said special grooves at the terminus of the playing groove. The present invention contemplates a gravity feed from the record reservoir to the playing platen, and the structure at present preferred contemplates a drop bottom for said reservoir, together with record separating means, whereby the bottom record in said reservoir will be allowed, upon the operation of certain instrumentalities, to gravitate from said reservoir onto the playing platen. Said playing platen preferably occupies a plane inclined to the horizontal. The present invention also contemplates centering means which will automatically center the record upon the playing platen after said record has gravitated to said playing platen, will move the tone arm to the correct starting position corresponding to the particular record being centered, and will insert the center pin through the central hole commonly found in phonograph records of the disk type. The present invention also contemplates means for setting the playing platen in operation and for feeding the needle of the sound box to the playing groove of the phonograph record. After said needle has engaged said groove, said needle and the tone arm which carries said needle will be moved toward the axis of the record by reason of said engagement, in accordance with usual practice. According to the present invention, the playing groove of the record upon the playing platen will be completely traversed and the playing platen will be stopped regardless of the internal and external diameters of the annular band covered by the playing groove of the record upon the playing platen. To this end, means are provided for causing a follower member to enter into cooperative relationship with a moving member whereby the record will be stopped after having been played, whether or not said record is provided with a groove extending sufficiently close to the axis of rotation for that purpose. The particular mechanism for this purpose has the advantage that no interference is had between the follower member above referred to and the playing groove of a record; that is to say, if the playing groove of a record or a special groove at the end of the playing groove of a record should carry the tone arm sufficiently close to the axis of rotation of the playing platen to operate the stop mechanism for said platen, mechanism connected to said tone arm will operate said stop mechanism. If, on the other hand, the playing groove or special groove at the terminus of the playing groove is not sufficient for this purpose, other means will come into play to carry certain stopping mechanism to record stopping position. The present invention also contemplates means for lifting the phonograph needle from the record after said record has been played, for releasing said record so that said record may gravitate into a storage space provided for that purpose, and for positively moving the tone arm outwardly away from the axis of rotation of the playing platen, ready for cooperation with the next record to be played. The present invention also contemplates means whereby the playing of a record may be repeated once or indefinitely at the option of the operator and whereby any particular record may be discharged from the playing platen at any time during the playing thereof at the option of the operator, which discharge will be followed by the feeding of another record from the storage reservoir to the playing platen.

Referring now to a detailed description of the apparatus, a phonograph cabinet is indicated by the numeral 25, which cabinet is provided with the lid 26, which, in accordance with usual practice, may be swung upwardly to allow access to the top portion of the cabinet 25. Disposed in the upper portion of the cabinet 25 is the support 27, which in a preferred embodiment of the present invention is disposed in a slanting position. Said support 27 may extend substantially to the right-hand wall of the cabinet 25. At the left side of the cabinet 25, the support is stopped short, the left-hand extremity of said support being provided with a sheet metal guide member 28, which cooperates with the bracket 29. Said sheet metal guide member 28 and bracket 29 form a pocket, indicated by the numeral 30, for the reception of phonograph records after said records have been played.

Carried by the support 27 is the base plate 31, which base plate has secured thereto the motor 32 and other mechanism which will be referred to more in detail presently. The support 27 is provided with an aperture, the boundaries of which are indicated in Figure 8 by the numerals 33—33. Said aperture 33 provides an opening for certain mechanism for supporting the motor 32 (Figure 1), and certain control mechanism, which will be referred to presently. The motor 32 has a shaft 34 (Figures 6 and 8), which shaft is disposed substantially at right angles to the plane of the support 27 and the base plate 31. Secured to said shaft 34 intermediate of its length (Figure 8) is the motor clutch element 35, which has cooperatively associated therewith the platen clutch element 36. Said platen clutch element 36 forms part of the housing 37 rigid with the platen 38. Said platen 38 is adapted to be moved axially, and two alternative positions of said platen 38 are indicated in Figures 6 and 8, the normal playing position being shown in full lines in said figures and the record discharging position being shown in dotted lines in said figures.

From an inspection of Figure 8 it will be noted that the shaft 34 extends upwardly through the platen housing 37 and is provided with a clearance space 39, which space provides clearance for a downwardly extending stud 40 extending from the under side of the center plate 40a, which is secured to the platen 38 centrally thereof. Said stud 40 provides material for a seat for a record center pin, to be referred to presently. The housing 37 of the platen 38 preferably has roller bearing assemblies 41—41 mounted interiorly thereof, the inner peripheral walls of which roller bearing assemblies are slidably mounted upon the shaft 34. The platen 38 is adapted to be raised by a pair of pads 42—42 (Figures 5 and 6), which pads are responsive to the movement of a pair of lifting levers 43—43 (Figures 3, 5, 6 and 8), which lifting levers are movable in response to mechanism which will be referred to in detail hereinafter.

According to a preferred embodiment of the present invention, the base plate 31 provides supporting means for all of the mechanism for operating the platen 38 and for controlling the records to be supplied to said platen and discharged therefrom. By reference to Figure 4, it will be noted that the base plate 31 supports a holding plate 44, said holding plate being shown as supported by bolts 45—45, spacing sleeves 46 being provided for securing the holding plate in rigid position. Secured to the holding plate 44 are the bearing bracket 47 and the bearing bracket 48. Said bearing brackets form supporting means for a shaft 49 disposed in parallel relationship with the holding plate 44. Said shaft 49 is disposed coaxially with a plurality of cam members for performing, in sequence, a plurality of predetermined functions, which functions have been briefly referred to above and which will be referred to more in detail hereinafter. Said shaft 49 may be termed a cam shaft or a master control member.

The holding plate 44 forms a support for a pair of brackets 50—50, which brackets at their lower extremities support a pivot plate 51, which pivot rod provides pivotal mounting means for certain levers, to be referred to in detail presently.

A plurality of cams, disposed coaxially of the shaft 49, have been illustrated in Figures 15, 16, 17, 18, 19 and 20. Sectional views of said cams appear in Figure 4. Other views of said cams appear in other figures and will be mentioned in the further description of the apparatus. For convenience, the cams referred to have been indicated by the letters A, B, C, D, E, F and G.

With reference to Figure 4, it will be noted that the cam A is rigidly secured to the shaft 49 at one extremity thereof by means of the setscrew 52. Said cam A is disposed at the left-hand side of the bearing bracket 47, which bearing bracket, it will be noted, is provided with the bearing sleeve 53 for rotatably receiving the shaft 49. Also rigidly secured to the shaft 49 is the pawl disk 54, which pawl disk is provided on its left-hand side with the cam groove B. The pawl disk 54 is secured in place upon the shaft 49 by means of the setscrew 54a. Said pawl disk has pivoted thereto near its periphery certain pawl mechanism, indicated as a whole by the numeral 55. Said pawl mechanism includes the toothed member 56 and the abutment member 57 (Figures 5 and 13). By reference to Figure 13 it will be noted that said members 56 and 57 swing about the pin 58 and are resiliently connected together by means of the spring 59. The pawl mechanism 55 is urged inwardly of the pawl disk 54 by means of the spring 60 (Figures 3, 4, 5 and 16). From an inspection of Figure 16 it will be noted that the spring 60 has one of its extremities secured to the pin 61 projecting from the pawl disk 54 and has its other extremity secured to the pin 62, which pin 62 extends through an aperture 63 in pawl disk 54; said aperture 63 being of sufficient size to allow the necessary oscillating movement of the pawl mechanism 55.

The pawl mechanism 55 is adapted to cooperate with the ratchet disk 64, which ratchet disk, it will be noted from an inspection of Figure 4, is rigidly secured to the sleeve 65 journaled upon the shaft 49. Also secured to the sleeve 65 is the drum 66, which drum is provided with a spiral groove. Keyed to the sleeve 65 is the worm wheel 67, through which power is communicated to the sleeve 65 from the motor 32 through power transmitting mechanism which will be described presently.

Referring further to Figure 4, it will be noted that the cam C (see also Figure 17) is disposed immediately to the right of the sleeve 65. Said cam C is rigidly secured, by means of the setscrew 68, to the shaft 49. Rigidly secured to the cam C is the cam D, which, as mentioned above in connection with the brief description of Figure 17, has the function of preventing interference between the rotating record and the record centering mechanism when the playing of a record is to be repeated.

Immediately to the right of the cam C is the sleeve 69, journaled upon the shaft 49. Said sleeve 69 has rigidly secured thereto the cams E, F and G, the outlines of which cams are shown in Figures 18, 19 and 20. Said cam C is adapted to be connected to and disconnected from said sleeve 69 by means of mechanism illustrated in Figure 21, which mechanism will be described presently. As clearly shown in Figure 4, the sleeve 69 has its bearing in the bearing bracket 48.

The various instrumentalities for operating the cam shaft or master control member 49 and associated cams and the instrumentalities responsive to movement of said cams will now be described.

The numeral 70 indicates a holding member for phonograph records to be played. Preferably, said holding member, which for convenience of description will be referred to hereinafter as a reservoir, is sufficiently large to hold a dozen or more records. As indicated in Figure 8 said reservoir is disposed in an inclined position at a level higher than the platen 38. Said reservoir 70 is provided with a drop bottom 71, which may be a sheet metal member. Said drop bottom is hinged about the axis 72. Said drop bottom 71 has secured thereto a pair of angle members 73—73 (Figures 2, 8 and 9), which angle members converge, as shown in dotted lines in Figure 2. The converging extremities of said angle members 73—73 are indicated by the numerals 74—74. Between the extremities 74—74 is the strengthening rib or brace 75, which is riveted or otherwise secured to the drop bottom 71. Said extremities 74—74 and the brace 75 are secured together and carry the roller 76, which roller cooperates with the cam F. As will be referred to more in detail hereinafter, said cam F holds the drop bottom 71 in closed position, except during a short interval of time when a record is to be discharged from the reservoir 70. As indicated in Figure 2, the top portion of the reservoir 70 comprises a wall member 77, rounded at its lowermost portion. The wall member 77 should be of sufficient size to take the largest disk records intended to be used in the phonograph. The wall member 77 is carried by the base plate 31, feet 78 being provided for that purpose, said feet spacing said wall member a sufficient distance above the base plate 31 to permit the full dropping action of the drop bottom 71. Said feet 78 are secured rigidly to the base plate 31. Said reservoir is shown in Figures 2 and 9 as holding records 79.

It is, of course, necessary that only one record at a time shall be allowed to gravitate out of the reservoir 70. To insure this action, a pair of dividing plates 80—80 are provided, which dividing plates extend through corresponding apertures in the wall 77. Said dividing plates 80—80 are mounted within brackets 80a—80a in position to move in a plane parallel with the drop bottom 71 when said drop bottom is in closed position, but are spaced above said drop bottom a sufficient distance to underlie the next to the bottom disk record lying upon said drop bottom 71. Said dividing plates 80—80 should have a sufficient range of action to separate the bottom disk record from the one lying immediately above it, regardless of the position of said records within the reservoir 70. The mechanism for controlling the dividing plates 80—80 is shown in perspective in Figure 14. By reference to said figure it will be noted that said dividing plates have secured thereto the lever arms 81 and 82, which lever arms are pivoted intermediate of the axis 83 and its particular dividing plate 80 about the axis 84, the base plate 31 comprising the pivotal support for said lever arms 81 and 82. The lever arm 81 is extended, as indicated by the numeral 85, said extension being bifurcated. Between the bifurcations of the extremity 85 there is located one extremity of the crank 86. Said crank 86 is pivoted upon the pivot rod 51 (Figure 4). Said crank has the extended wall portion 87 provided with the slot 88 adapted to receive the crank pin 89. Said crank pin 89 is carried by the cam G at a region spaced from the axis of rotation of said cam G. It will be clear that as the cam G rotates, an oscillating movement will be communicated to the crank 86, which oscillating movement will be communicated to the extension 85 of the lever 81, which lever swings about the axis 84 (Figure 14). By reason of the pivotal connection of lever 82 to lever 81 about the axis 83, a similar oscillating movement will be communicated to said lever 82. It will be clear, therefore, that oscillating movement will be communicated to the dividing plates 80—80 in response to operation of the cam G.

The tone arm of the phonograph is indicated by the numeral 90, which tone arm is provided with the sound box 91 having the needle 92 (Figure 3). The tone arm 90 may connect, through a flexible connection (not shown) to the horn (not shown) of the phonograph, or the diaphragm of the sound box 91 may have its pulsations transmitted in any other preferred way, as for example through an electrical pick-up involving the use of radio tubes. The means for transmitting said pulsations form no part of the present invention. By reference to Figure 10, the means for mounting the tone arm 90 will be clear. The numeral 93 indicates a tone arm bracket, which bracket includes the arm portion 94 mounted to swing in a plane parallel with the platen 38, which plane, it will be remembered, is inclined to the horizontal. The arm portion 94 of the tone arm bracket has a pair of upstanding ears 95—95, which ears pivotally support the tone arm 90 by means of the pins 96, one of which is indicated in Figure 10. Said tone arm 90 is thereby permitted a swinging action in a direction at right angles to the platen 38. The tone arm 90 and the tone arm bracket 93 are also adapted to swing about an axis perpendicular to the plane of the platen 38. The pivotal mounting means for providing the swinging action last referred to includes the rod 97, which rod is rotatably mounted, being disposed (Figures 3 and 10) between the lower bracket 98 and the upper bracket 99 forming part of the wall portion 77 of the record reservoir 70. By reference to Figure 3 it will be noted that the lower extremity of the rod 97 cooperates with a pivot 100 and the upper extremity of said rod 97 cooperates with the threaded pivot pin 101. The tone arm casting 93 is provided with the counterweight 102, which counterweight is disposed in the same plane as the neutral axis of the tone arm 90, which plane is normal to the plane of the platen 38. Said counterweight 102 is disposed upon a rod 103 (Figures 3 and 10) and the position of said counterweight may be adjusted by manipulation of the setscrew 104. The rod 97 is connected to the tone arm bracket 93 by means of the cross rod 105 (Figure 10), which cross rod is journaled in the ears 95—95 of the tone arm bracket 93.

Under normal playing conditions the tone arm 90 should, of course, be free to swing vertically about the pins 96 to conform to the playing groove of the record being played. According to the present invention, the tone arm bracket 93 is provided with means for lifting said tone arm from its normal playing position, swinging said tone arm about the axis of the cross rod 105. Referring to Figures 2 and 3, it will be noted that the tone arm bracket 93 has extending therefrom the shelf 106 in a position to underlie the tone arm 90. Said shelf 106 is provided with a screw-threaded aperture for the reception of a setscrew 107, which setscrew may be locked in predetermined position by means of the lock nut 108. The upper extremity of the setscrew 107 underlies a flexible, spring-like member 109, best shown in Figure 2, which member is connected to the wall portion 77 of the adjacent reservoir 70. When the tone arm bracket 93 is swung a short distance in a clockwise direction as the parts are viewed in Figure 3, the setscrew 107, by reason of its lifting action upon the flexible member 109, will swing the tone arm out of its operative playing position. Said flexible member 109, by reason of the fact that it is gripped between the setscrew 107 and the under side of the tone arm 90, acts as a brake to prevent undesired swinging action of the tone arm 90 when it is freed from the playing groove of the record upon the platen 38.

The braking relationship between the flexible member 109 and the tone arm 90 is necessary only when the tone arm is in its outermost position preparatory to depositing of the needle 92 carried by said tone arm into the playing groove of the record or into the spiral groove leading to said playing groove. In order to prevent the braking relationship referred to at other times, the flexible member 109 may be provided with the slot 109a (Fig. 2), whereby said flexible member 109 will be ineffective to perform holding functions with reference to the tone arm 90, except when said tone arm is in the outer portion of its range of travel parallel to the platen 38.

The means for tilting the tone arm bracket 93 includes an arm 110 pivoted to said bracket 93. Said bracket carries at its swinging extremity a roller 111 riding in the cam groove B (Figures 3, 10 and 16).

The means for moving the tone arm 90 outwardly after a record has been played includes the cam A (Figures 3, 4 and 15). Pivoted to the bearing bracket 47 (Figure 3) is the lever 112, which lever is pulled in a counter-clockwise direction, as the parts are viewed in Figure 3, by means of the spring 112a. Intermediate of the length of the lever 112 is the roller 114 adapted to engage the periphery of cam A. The upper extremity of the lever 112 is adapted to engage the tone arm bracket 93, whereby when the high portion of cam A engages roller 114 the upper extremity of said lever 112 will move said tone arm bracket 93 in a direction to swing the tone arm outwardly. The cam A is so related to the cam groove B that the outward swinging of the tone arm 90 will be had only after the tone arm has been tilted out of its operative playing position.

The present invention contemplates a center pin 113 (Figure 4) adapted to cooperate with the central hole commonly found in phonograph records of the disk type. Said center pin is adapted to be raised and lowered automatically, being lowered either simultaneously with or subsequently to the centering of a record upon the playing platen 38 and being raised after a record has been played in order that said record may gravitate from the playing platen 38. From an inspection of Figure 4 it will be noted that the center pin 113 is rotatably carried by the plunger 115, which plunger is adapted to have a sliding movement within the sleeve 115a carried at the extremity of the arm 116. By reason of the rotatable mounting of the center pin 113 said center pin, the platen and the record carried by said platen are adapted to rotate as a unit, the center pin being carried around as said platen rotates. Said arm 116 is rigidly carried by the base plate 31. One side of the sleeve 115a is slotted, as indicated by the numeral 117, to permit a reciprocatory movement of the operating member 118, the swinging extremity of which has a rolling engagement with the plunger 115. The operating member 118 in a preferred embodiment of the present invention is substantially U-shaped in contour, the lower leg of said operating member being indicated by the numeral 119, the upper leg being indicated by the numeral 120, and the intermediate portion being indicated by the numeral 121. Said intermediate portion 121 is pivoted to the arm 116 at the point 122. The spring 123 normally biases the operating member 118 in a counter-clockwise direction as the parts are viewed in Figure 4, which is to say that said spring has a normal tendency to urge the center pin 113 into engagement with the platen 38. The lower leg 119 is pivotally connected to a lever 124 (Figures 4 and 8), the pivotal connection between leg 119 and lever 124 being hidden from view in Figure 4. Said lever 124 (see Figure 8) is fulcrumed to swing about the axis 126, being pivotally supported by the bracket 127 depending from the base plate 31. Intermediate of its ends, said lever 124 has the roller 128 rotatably carried thereby, which roller 128 cooperates with the cam G. When a high part of said cam G engages the roller 128, the lever 124 will be swung in a clockwise direction as the parts are viewed in Figure 8, which movement, by reason of the pivotal connection of lever 124 with the lower leg 119 of the operating member 118, will result in the lifting of the center pin 113.

The present invention contemplates means for lifting the platen 38 after a record has been played and for discharging said record, unless instrumentalities to be referred to later are placed in position to cause the repeating of the playing of said record. The lifting of the platen 38 is accomplished by instrumentalities including the cam E (Figures 6 and 18). Said cam E cooperates with the roller 129 mounted at an extremity of the lever 130. Said lever is rotatably supported by the brackets 131—131, which brackets are rigid with the base plate 31. The lifting levers 43—43 above referred to (Figures 3, 5, 6 and 8) are rigid with respect to lever 130, being, in effect, bifurcations of said lever 130. When a high part of said cam E engages said roller 129, the lifting levers 43—43 will be moved in a clockwise direction as the parts are viewed in Figure 6, resulting in an upward pressure upon the pads 42—42 (Figures 5 and 6). Said pads 42—42 are secured to the swinging extremities of the cantilever springs 132—132, which springs normally hold said pads free of said platen when said platen is in its normal playing position. Said cam E is adapted, however, to swing the lifting levers in a clockwise direction as the parts are viewed in Figure 6, to lift said pads to raise the platen 38, and by the same action separate the platen clutch element 36 from the motor clutch element 35 (Figure 8). Said pads 42—42, therefore, operate to declutch the platen from the driving motor and to serve as brakes to stop the motion of the platen.

Inasmuch as the platen 38 is disposed in a position inclined to the horizontal, a record upon said platen 38 will have a tendency to slide therefrom as soon as the center pin 113 (Figure 4) is drawn upwardly. The raising of the platen 38 as above referred to will lift the record upon said platen to a level sufficient to clear certain centering pins (to be distinguished from the center pin 113), which will be referred to presently. The raising of said platen 38 will elevate the record upon said platen to a sufficient extent so that said record will slide down upon the sill or block 133 (Figure 1). Said sill or block has a rounded portion adjacent to the pocket 30, which will guide a record discharged from the platen 38 into said pocket without interference with the centering pins referred to.

The cam E is so designed that after the record upon the platen 38 has had an opportunity to gravitate therefrom, the lever arms 43—43 will be depressed (due to the gravity thereof and the influence of the cantilever springs 132—132) sufficiently to allow the platen to lower almost but not quite to the position in which the platen clutch element 36 engages with the motor clutch element 35 (Figure 8). At this time the cam F (Figures 8 and 19) is operative to permit the dropping of the drop bottom 71 of the record reservoir 70. At this time also the dividing plates 80—80, which are controlled by the crank 86, which in turn is controlled according to movement of the cam G (Figures 8, 14 and 20), are in underlying relationship with the next to the bottom record in the reservoir 70, so that at this time the bottom record in said reservoir 70 may slide out onto the platen 38.

The means for arresting motion of the record 79 which is moved onto the platen 38 and for centering said record will now be described. By reference to Figures 2, 5, 6 and 8 it will be noted that four upstanding pins or members 134—134 are provided, which pins extend upwardly through slots 135 in the base plate 31. Said pins 134—134 are disposed at the outer extremities of links bearing the numerals 136, 137, 138 and 139. Said links, at their inner extremities, are pivotally connected to an annular member 140 (Figures 2, 5 and 8), which annular member, as shown in Figure 8, has a bearing upon a shoulder 141 in the base plate 31. It will be clear without detailed explanation that if a rotary movement is communicated to the annular member 140 in a clockwise direction as the parts are viewed in Figure 5, the centering pins 134—134 will be drawn toward the axis of rotation of the platen 38. Conversely, a reverse movement of said annular member 140 will move said centering pins 134 outwardly. Rotary movement is communicated to said annular member 140 by means of the link 142 (Figures 5, 6 and 7). The outer extremity of the link 142 is pivotally connected to the lever 143, which is fulcrumed to the plate 51 (Figs. 4, 6 and 8). By reference to Figure 4 it will be clear that the lever 143 is bifurcated in the illustrated embodiment of the present invention at the part thereof which is fulcrumed to the plate 51. Intermediate of its length the lever 143 carries the rotatable roller 144, which roller is adapted to engage the periphery of cam C (Fig. 6). The lever 143 is urged in a counterclockwise direction (Fig. 6) by the action of a spring 145, which spring has one extremity connected to the link 142 and the other extremity thereof connected to a relatively fixed part of the mechanism. Said spring normally biases the annular member 140 in a clockwise direction as the parts are viewed in Figure 5, tending to move the centering pins 134 toward the axis of rotation of the platen 38. When a high part of the cam C is in engagement with the roller 144 (Fig. 6), the centering pins 134—134 will be moved outwardly.

From an inspection of Figure 2 it will be noted that the links 136 and 137 are curved intermediate of their length, whereas the link 138 is straight and the link 139 is straight in that portion thereof between its corresponding centering pin 134 and its point of pivotal connection with the annular member 140. It will be understood that the curvature in the links 136 and 137 is provided for the purpose of clearing one another. From an inspection of Figure 2 it will be noted that the link 139 is extended to form a bent end portion 146, which end portion is provided with the setscrew 147. Said setscrew is adapted to engage the side of the sound box 91 mounted upon the tone arm 90. It will be clear that as the centering pins are moved inwardly to center a record upon the platen 38, said setscrew 147 will, with the same movement, move the sound box 91 inwardly toward the axis of rotation of the platen 38 in correspondence with the particular record being centered upon the platen 38. It will be clear that the cam C and its associated parts will be designed to move the centering pins 134—134 outwardly a sufficient distance to embrace the largest record intended to be used. The spring 145 is of sufficiently great length so that no difficulties are encountered in centering records of different sizes.

With reference to the action of the setscrew 147 in moving the sound box 91 to the starting position for the particular record being centered, it may be noted that there is, of course, a difference in the margins of various records. The radial distance between the outer periphery of one record and the outer periphery of the playing groove may vary, of course, from the corresponding radial difference in another record, but such differences are not great in practice. In most records a spiral groove is provided, which introduces the playing needle to the playing groove. Such spiral introductory groove occupies sufficient space radially of the record to take care of differences in the margin referred to in phonograph records found upon the market at the present time. It will be understood that the parts will be so adjusted that the setscrew 147 will move the sound box 91 to a position such that when the tone arm casting 93 has been tilted to allow the tone arm to descend to playing position, the needle 92 of said sound box 91 will engage the playing groove or the spiral groove leading to the playing groove on the record having the largest margin encountered in practice.

As indicated above, the tone arm 90 and the parts carried thereby are balanced by the counterweight 102 (Figure 10). By reason of the counterweight 102 the playing needle 92 is relieved of side pressure, whereby a clear note will be produced thereby uninfluenced by side pressure against the side walls of the playing groove. If preferred, however, the counterweight 102 may be so adjusted on the rod 103 that it will not quite counterbalance the tone arm 90 and the parts carried thereby, the net result being that the needle 92 will tend to swing toward the axis of platen 38 due to the action of gravity in said tone arm 90 and associated parts. Under these conditions, if the needle 92 should be lowered onto a record outside of the playing groove or the spiral groove leading to said playing groove, the action of gravity will result in the engagement of said needle with said playing groove or spiral groove leading thereto.

It may be stated at this time that the center pin 113 is lowered into the central hole of the record upon the platen 38 when said record is being held by the centering pins 134—134, after which said centering pins 134—134 are moved outwardly under the influence of cam C. The brake pads 42—42 are then allowed to lower by means of cam E, whereby they are freed from the under side of the platen 38 (said pads being normally biased out of contact with said platen) and allowing the platen clutch element 36 to engage the motor clutch element 35, setting the platen 38 into rotation. The needle 92 is allowed to lower by the cam groove B (Figure 3), which allows the tone arm bracket 93 to tilt, depressing the shelf 106 and allowing the needle 92 to enter the groove of the record upon the platen 38. All of the above movements are accomplished by mechanism which has already been described.

The means for communicating power from the motor 32 to the various elements above recited and to other elements to be described hereinafter will now be referred to. By reference to Figures 3 and 8 it will be noted that the shaft of the motor 34 is provided with the driving spiral 148, which driving spiral 148 communicates movement to the driven spiral 149 (Figures 3 and 4), which driven spiral 149 is fast to the shaft 150, which has its bearing supported by the holding plate 44 (Figure 4). Also fast upon the shaft 150 is the worm 151, which worm meshes with the worm wheel 67. Said worm wheel 67, as is clearly shown in Figure 4, is keyed to the sleeve 65, which sleeve, as mentioned above, has secured thereto the ratchet plate 54. Said sleeve 65 also has secured thereto the drum 66, which drum is provided with a spiral groove for a purpose which will be referred to presently. As mentioned above, the pawl mechanism 55 is adapted to establish a driving relationship between the ratchet disk 64 and the pawl disk 54, which pawl disk is rigid with the shaft 49. When the pawl mechanism 55 is in a position to clutch the ratchet disk 64 to the pawl disk 54, rotation of the motor 32 will communicate a driving movement to the pawl disk 54, whereby the cam groove B will be operative to control the tone arm bracket 93 (Figure 10) which in turn controls the lifting of the tone arm 90. Cam A, being rigid with the shaft 49, will also be rotated, as will be the drum 66. Cam C is also rigid with the shaft 49. The sleeve 69, which carries cams E, F and G, is adapted to be pinned to the cam C to rotate therewith. Figure 21 shows the pin 153 carried within the hub of the cam C; said pin 153 being projected outwardly by the spring 154. Said pin has a conical head adapted to pilot said pin into the socket 155 in cam E, which cam is fixed relative to the sleeve 69. The spring-pressed pin 153 is controlled in response to mechanism which will be described presently.

As mentioned above, the present invention contemplates means for handling disk records manufactured by the various well known manufacturers. It is common to provide a special groove at the inner terminus of the playing groove, which special groove, through cooperation with the playing needle, guides the tone arm to a position or in a direction to stop the platen when the playing of the record has been completed. This special groove in some instances takes the form of a spiral.

In other instances it takes the form of an ellipse. Other special grooves are found in practice. Still other records do not have any special groove at the inner terminus of the playing groove. According to the present invention, as long as the motor 32 is in operation and while the pawl mechanism 55 is in position to maintain a driving relationship between the ratchet disk 64 and the pawl disk 54 (Figures 4, 5 and 12), turning movement will be communicated to the shaft 49 and the cams connected thereto. While the record is being played, this driving relationship is interrupted, but in order to stop the platen to discharge the playing record therefrom and to supply a new record to said platen from the reservoir 70, said shaft 49 and the cams driven thereby should be set in operation.

The mechanism for controlling the pawl mechanism 55 will now be described. By reference to Figures 4 and 12, it will be noted that the holding plate 44 provides a pivotal support for a lever 156, which lever 156 carries a setscrew 157 adapted to underlie the portion 57 of the pawl mechanism 55. When the setscrew 157 is in underlying relationship with the portion 57, the pawl mechanism 55 is held out of operative relationship with the ratchet disk 64. The present invention contemplates means whereby said setscrew is removed from abutting relationship with the portion 57 of the pawl mechanism 55 for the purpose of setting instrumentalities in operation for stopping the platen, discharging the playing record and supplying a new record to said platen. The lever 156 is biased in a clockwise direction as the parts are viewed in Figures 4 and 12, by the spring 157a. Movement of the lever 156 in a counter-clockwise direction as the parts are viewed in Figure 4 is limited by means of the setscrew 158. By reference to Figures 10, 11 and 12, the mechanism for moving the lever 156 will be clear, it being noted that in Figure 11, set screw 172 is shown broken away in order to show set screw 161. It will be noted that the tone arm bracket 93 carries the member 159, which member is rigidly attached to said tone arm bracket. The outer extremity of said member 159 is indicated by the numeral 160 and is adapted to engage against the end of a setscrew 161 carried by the lever 156. It will be clear that when the tone arm bracket 93 is swung in a clockwise direction as the parts are viewed in Figure 11 to engage said setscrew 161, said lever will be moved in a direction to disengage the setscrew 157 from abutting relationship with the portion 57 of the pawl mechanism 55, whereby said pawl mechanism may clutch together the ratchet disk 64 and the pawl disk 54. This mechanism will be sufficient for stopping the platen 38 in case the groove in the record being played extends sufficiently close to the axis of rotation of said platen to cause the member 159 to move the lever 156. In certain records the groove does not extend sufficiently close to the axis of rotation of the platen 38 for this purpose, and auxiliary means are provided which include the drum 66, which, as noted above, is provided with a spiral groove in its periphery. The numeral 162 indicates a stylus bar, which is pivoted to a bracket 163 (Figures 10 and 11), which bracket is rigid with the base plate 31. The stylus bar 162 is provided with the stylus 164 adapted to engage the spiral groove in the periphery of the drum 66. Said stylus bar 162 is capable of a swinging movement parallel to the axis of rotation of the drum 66 and is also capable of a slight swinging movement in a plane at right angles to the axis of rotation of said drum 66. The drum 66 with its spiral groove may be termed a spiral member and the stylus 164 may be termed a follower or follower member. Said stylus bar 162 is provided with the lateral extension 165, the extremity of which is adapted to be disposed upon the sill 166 of the bracket 167, which bracket is rigid with the base plate 31. Said sill 166 presents the sloping surface 168 to the extremity of the lateral extension 165, whereby as said lateral extension is moved in a counter-clockwise direction as the parts are viewed in Figure 11, said lateral extension will ride up upon said sill 166. Said lateral extension 165 (see Figure 10) rides upon the upper surface of the adjacent member 159 carried by the tone arm bracket 93. For the purpose of providing a guide for said lateral extension 165, said member 159 is provided with the portion 169 projecting beyond the extremity 160. By reference to Figure 10 it will be noted that the member 159 is provided with the shoulder 170 adapted to engage the extremity of the lateral extension 165, whereby the tone arm casting 93 in swinging about the axis of the rod 97 in a counter-clockwise direction will, by reason of the engagement of shoulder 170 with lateral extension 165, move said lateral extension 165 up upon the shelf 166 (Figure 12). The stylus bar 162 is provided with the setscrew 171 adapted to be engaged by the member 159 as the tone arm casting moves in a clockwise direction (Figure 11). It will be clear that when the tone arm casting 93 moves to a predetermined position in a clockwise direction (Figure 11) the stylus bar 162 will be moved in a clockwise direction whereby the lateral extension will be shoved from the sill 166 of the bracket 167. The drum 66 is so positioned that when the lateral extension 165 drops off the sill 166, the stylus 164 will engage in the spiral groove of said drum 66. It will be remembered that the drum 66 is constantly rotated as long as the motor 32 is energized. Rotation of the drum 66 will positively move the stylus bar 162 in a clockwise direction as the parts are viewed in Figure 11. The lateral extension 165 of said stylus bar is disposed in such a position that it is adapted to engage the setscrew 172 carried by the lever 156 to swing said lever 156 to a position in which the setscrew 157 is removed from holding relationship with the member 57 of the pawl mechanism 55, to connect ratchet disk 64 to pawl disk 54 and to cause rotation of the cam groove B, which operates through roller 111 (Figure 10) to tilt the tone arm bracket 93 to lift the needle 92 of the sound box out of engagement with the record on the platen 38. This action is accompanied by operation of cam E, which causes swinging of the lifting levers 43 (Figure 6) to lift the platen 38, declutching same from the motor clutch element 35 (Fig. 6) and stopping rotation of said platen 38 by reason of the frictional engagement of pads 42—42 with the under side of said platen.

The mechanism by means of which the operator may reject any record and cause the automatic discharge thereof from the platen, followed by the supplying of a new record, will now be described.

By reference to Figures 1 and 4 it will be noted that a button 173 is provided, which button controls a rod 174. Said rod is spring-pressed outwardly by means of the spring 175 (Figs. 4 and 5). Said spring is illustrated as being a tension spring and has one of its extremities connected to a fixed abutment 176 rigid with the base plate 31. The other extremity of said spring 175 is connected to a stud 177 rigid with the rod 174. Said abutment 176 forms a journal for slidably supporting the rod 174. Spaced from the abutment or journal 176 is another journal 178. The inner extremity of the rod 174 is flat on its upper side, as indicated by the numeral 179. A cross rod 180 is carried by the journal 178 for preventing turning of the rod 174. The provision of means for preventing turning is had for the purpose of conserving space. The inner extremity of the rod 174 is also provided with a flat portion on its under side, leaving the relatively thin inner extremity 181, adapted to contact with the lever 156 when the button 173 is pushed inwardly. It will be clear that if said button 173 is pushed inwardly during the playing of a record, the lever 156 will be swung in a clockwise direction as the parts are viewed in Figure 4, removing the pin 157 from its underlying relationship with the member 57 forming part of the pawl mechanism 55, thereby clutching the ratchet plate 64 to the pawl disk 54 and inaugurating the cycle of stopping the platen from rotation, lifting said platen to discharge the record therefrom, moving the tone arm outwardly, delivering a new record to the platen, starting the platen in rotation, and setting the tone arm in proper position to start the playing of said record.

Means will now be described whereby the operator may during the playing of a record cause the single repetition of the playing of said record or the continued repetition of the playing of said record. The means for accomplishing this result is illustrated in Figures 1, 2, 4, 6, 21, 22, 25 and 26, as well as other figures of the drawings. It will be remembered that cam F controls the feed of records successively from the reservoir 70 to the playing platen 38, and that cam G operates the center pin of the playing platen and controls the means for separating the records in the reservoir 70 preparatory to the supply of one of said records from said reservoir to the playing platen. The structure referred to contemplates means whereby cams F and G and the mechanisms controlled thereby may be rendered inoperative at the option of the operator. Referring to Figures 1 and 2, the numeral 182 indicates a turn button. Said turn button operates a rod 183, the inner extremity of which is secured to the swinging plate 184 (Figs. 6, 21, 22, 25 and 26). Said rod 183 is provided adjacent to the turn button 182 with the indicating finger 185, which has three selectable positions, indicated in Figure 1 by the letters R, N and C; the letter R indicating the position for the single repetition of the playing of a record, the letter N indicating the neutral position in which the normal operation of the device is permitted, and the letter C indicating the position for continued repetition of the playing of a record. The indicating finger 185 has the added function of releasably holding the rod 183 and the plate 184 in selected position. By referring to Figure 6 it will be clear that the weight of said plate 184 will tend to cause the swinging of said plate from the position indicated in said figure in a counter-clockwise direction. As shown in said Figure 6, the plate is in neutral position. The position of said plate for a single repetition of the playing of a record is defined by the pin 186, and the position of said plate 184 for the continued repetition of the playing of a record is defined by the pin 187. It will be clear that when the plate 184 has been moved to the position for the single repetition of the playing of a record, the effect of gravity will be to hold said plate 184 in said position. In order to releasably hold said plate in either neutral position or the position for the continued repetition of the playing of a record, said indicating finger 185 is provided with an aperture or recess 188 adapted to receive the rounded head of a pin 190, mounted in the wall of the phonograph cabinet 25, for releasably holding the indicating finger 185 in neutral positon, or the correspondingly rounded head of an adjacent pin 191 for holding said indicating finger in the position for causing the continued repetition of the playing of a record. Referring now particularly to Figure 4, it will be noted that the cam C is fast to the shaft 49, which shaft is caused to rotate when the pawl mechanism 55 has caused a clutching relationship between the ratchet disk 64 and pawl disk 54. Said cam C is adapted to be pinned to the adjacent cam E by means of the spring-pressed pin 153 (Fig. 21). Said pin 153 is provided with the outstanding stud 192 adapted to be controlled by the plate 184 above referred to. By reference to Figures 25 and 26 it will be noted that the swinging extremity of said plate 184 is bifurcated, the two legs thereof being indicated by the numerals 193 and 194. The inner edge of the leg 193 is beveled at a relatively sharp angle, as indicated by the numeral 195. The edges of the leg 194 are beveled at a lesser angle, as indicated by the numerals 196 and 197. When the plate 184 is swung, by means of the turn button 182, to position for a single repetition of the playing of a record, that is—to the position R in Figure 1, the beveled surface of the leg 193 of said plate 184 will engage the stud 192 (Fig. 21), retracting the spring-pressed bolt 153, thereby disconnecting cam E and sleeve 69 from driven relationship with the shaft 49. This means that when the ratchet plate 64 is clutched to the pawl disk 54 to cause the stopping of the platen 38, the lifting of the tone arm 90, the swinging outwardly of said tone arm, and the depositing of the tone arm for the next playing operation, said operations will not be accompanied by the operations controlled by the cams E, F and the cam G, namely, the lifting of the platen 38 to record discharging position, the feeding of a new record from the reservoir 70, the operation of the center pin 113 and the operation of the dividing plates 80—80.

At this point it may be noted that the cam D, which is fast with the cam C, is adapted to cooperate with the roller 198 carried by the lever 139. Said roller 198 has its axis fixed relative to the axis of the roller 129, also carried by the lever 130. Said roller 198 is engaged by the cam D as the cam C rotates and swings the lever 130 in a clockwise direction a sufficient distance to raise the platen 38 to an intermediate position, sufficient to cause the declutching of the clutch elements 35 and 36, (Fig. 6), to stop rotation of the platen 38. By reason of the stoppage of the platen 38 there is no interference between the record upon said platen 38 and the centering pins 134—134. As the cam C rotates, the stud 192 will be carried out of engagement with the leg 193 of the plate 184, and, being biased by the spring 154, will be operative to snap into the recess 155 in the cam E when said pin 153 comes into registry with said socket 155. Figure 25 illustrates part of the orbit of the stud 192 and shows diagrammatically the relation of the pin 153 and socket 155. As the pin 153 travels in its orbit due to the rotation of cam C, the stud 192 will strike the beveled edge 195 of the leg 193. Inasmuch as said beveled edge is relatively steep, the net effect will be to swing the pin 184 in a clockwise direction as the parts are viewed in Figure 25, moving the leg 193 out of position to again retract the pin 153, and allowing said pin to snap into socket 155, whereby the sleeve 69 and the cams E, F and G movable therewith will be operative upon the next succeeding operation of cam C.

Referring now to the structure for causing the continued repetition of the playing of a record, such an operation will be responsive to the action of the operator in moving the turn button to the position C (Fig. 1). This action will cause the swinging of the plate 184 in a clockwise direction as the parts are viewed in Figures 6 and 25, causing the beveled edge 196 of the leg 194 to engage the stud 192, resulting in the retraction of the pin 153 (Fig. 21), disconnecting cam E (together with sleeve 69 and cams F and G) from cam C. As indicated above, the indicating finger 185 will hold the cam plate 184 releasably in the position referred to. The result is that each time the cam C is caused to rotate, the stud 192 connected to the spring-pressed pin 153 will ride up over the beveled edge 197 of the leg 194 of the plate 184, rotation of the plate in a clockwise direction (Figs. 2 and 25) being limited by the pin 187. Under these conditions the sleeve 69 with its cams E, F and G will be rendered inoperative, whereby there will be no discharging of the played record from the platen nor delivery of a new record from the reservoir 70. Not until the operator moves the turn button 182 to neutral position or to the position for a single repetition (that is—position R) can the pin 153 find its way into the socket 155 to connect cams E, F and G in driving relationship with the cam C.

The turn button 182 and the parts controlled thereby are useful also in the operation of the phonograph for the non-automatic selection of records to be played. If the operator should desire to insert records upon the platen 38 and to remove them manually, he will turn the turn button 182 to the point C. Each time that the playing of a record has been completed and the platen stopped, he may lift the record from said platen, insert another one if he desires, and, after the tone arm has been automatically deposited in playing position, the playing of the inserted record will be begun.

Figure 27:
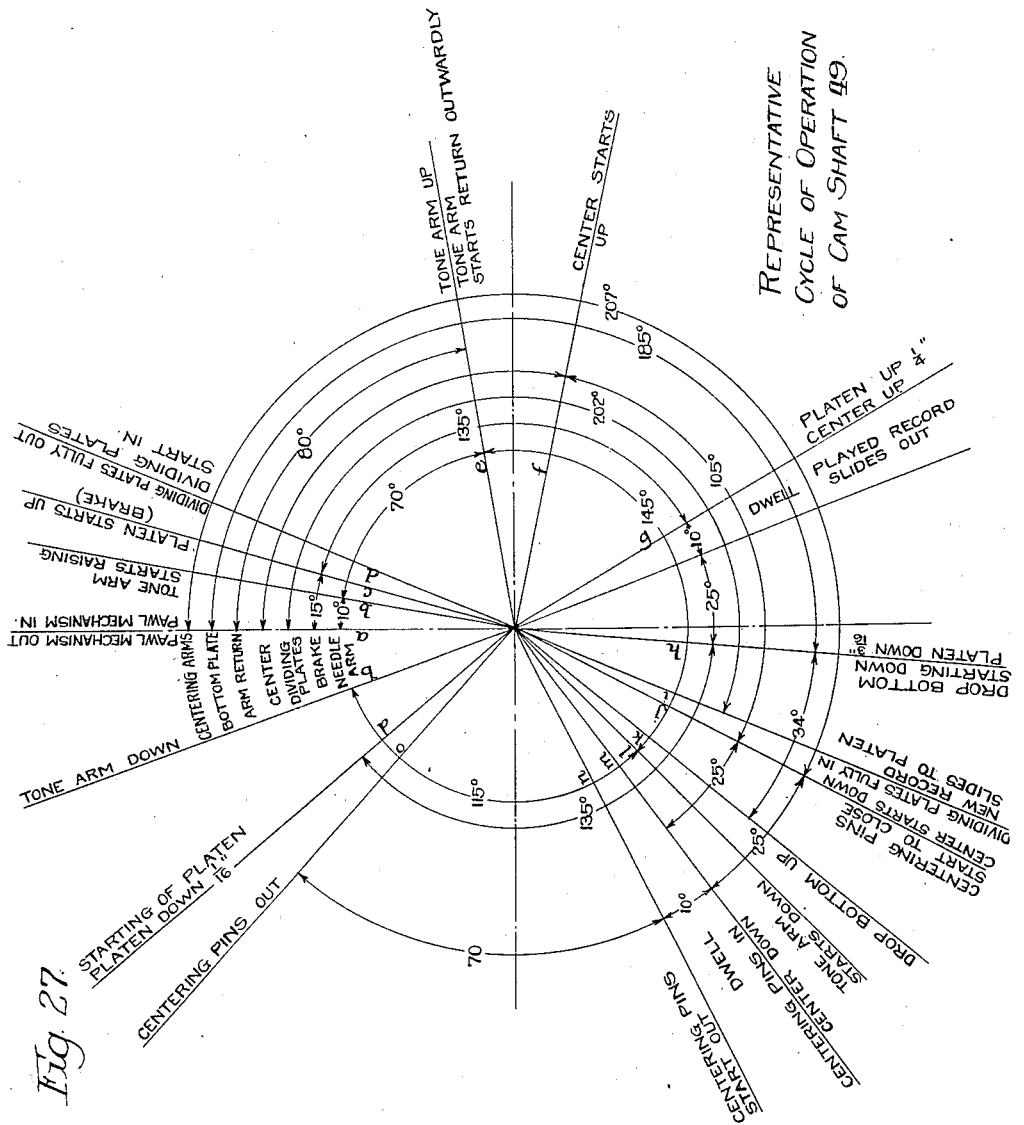
Figure 27 is a diagram illustrating a preferred cycle of operation of the instrumentalities illustrated in the preceding figures.

In outlining the mode of operation of the above described instrumentalities, reference may be had to Figure 27, which illustrates a representative cycle of operation of the cam shaft or master control member 49. For the purpose of this description, a cycle may be said to have been completed when the pawl mechanism 55 is moved out of cooperative relationship with the ratchet disk 54. At this time, assuming that the motor 32 is operating, said motor is, through the power transmitting mechanism above described, driving the sleeve 65 and the ratchet disk 64. A new cycle may be said to start when the pawl mechanism 55 is released, to establish a driving relationship between the pawl disk 54 and ratchet disk 64. The position of the cam shaft 49 at this time is indicated in Figure 27 by the letter a.

Starting from the instant at which driving relationship is established between said ratchet disk 64 and the pawl disk 54, and assuming a clockwise direction of rotation as the diagram in Figure 27 is viewed, it will be noted that after the cam shaft 49 has rotated through a small angle to the position b, the tone arm 90 starts to rise. This action is followed shortly (when position c is reached) by the action of the pads 42—42 in lifting the platen 38, which movement has a braking action. At this time and for succeeding portions of the cycle of movement of the cam shaft 49, the dividing plates 80—80 are out of cooperative relationship with the records in the reservoir 70, so that the pile of records within said reservoir 70 rests upon the drop bottom 71 of said reservoir. The outermost positions of the dividing plates 80—80 are attained when cam shaft 49 reaches position d. After the cam shaft 49 has rotated still further to position e, the tone arm 90 will have reached its fully raised position and will have started its outward movement. After further rotation of the cam shaft 49 to position f, the center pin 113 starts up. After still further rotation of the cam shaft 49 to position g, the platen will have been raised to the limit of its movement, which in a practical embodiment of the present invention amounts to a total raise of ¼ of an inch. At this time the center pin 113 is fully up. After this a period of dwell is allowed, whereby the played record may slide out from the platen 38 into the storage space 30. Still further rotation of the cam shaft 49 to position h results in the starting downwardly of the bottom plate 71 of the reservoir 70 and allows the platen 38 to drop to an intermediate position, which in a practical embodiment of the present invention has been chosen as $\frac{7}{16}$ of an inch below its fully raised position, which is to say—$\frac{1}{16}$ of an inch above its normal playing position. Under these conditions the pads 42—42 have a braking action to prevent any rotation of the platen 38. At this time, moreover, the clutching relationship is broken between the clutch elements 35 and 36. After further rotation of the cam shaft 49 to position i, the dividing plates 80—80 will have been moved inwardly to a position to underlie the next to the bottom record upon the drop bottom 71 of the reservoir 70. The drop bottom 71 will be open at this time and the record below the dividing plates 80—80 will slide downwardly from the reservoir 70 to the platen 38. In sliding onto the platen, the record from the reservoir 70 will engage the centering pins 134—134 at the low side of the platen 38, inasmuch as said platen 38 is now in a somewhat lowered position, that is—$\frac{1}{16}$ of an inch below its fully raised position. The record sliding from the reservoir 70 will clear the centering pins 134—134 at the top side of the platen 38, inasmuch as the reservoir 70 is in raised position (by virtue of the feet 78—78).

After the cam shaft 49 has rotated through a slightly greater angle to position j the centering pins 134—134 start to close, centering the new record upon the platen 38. At the same time the center pin 113 starts downwardly. Said center pin 113 has a piloting extremity, whereby it will cooperate with the centering pins 134—134 in centering the record.

After further rotation of the cam shaft 49 to position k, the bottom plate 71 of the reservoir 70 will be moved upwardly, and after another increment of movement of said cam shaft 49 to position l, the tone arm 90 starts down. After another increment of rotation of the cam shaft 49 to position m, the centering pins 134—134 will be in their innermost positions for the particular record being centered and the center pin 113 will be down in operative position. As explained above, the relatively long spring 145 will permit the centering of various sizes of record by the centering pins 134—134. After a short period of dwell, indicated in the diagram as being about 10 degrees of movement of the cam shaft 49, i. e. when cam shaft reaches position n, the centering pins 134—134 start outwardly. After the cam shaft 49 has reached position o, said centering pins 134—134 will be fully out, and after a further increment of movement of the cam shaft 49 to position p the platen will be allowed to descend another $\frac{1}{16}$ of an inch to its normal playing position, in which the clutching elements 35 and 36 are in operative relationship with each other. At this time also the pads 42—42, being biased downwardly, are out of braking relationship with said platen 38. The platen is now in operation with a record thereon ready to be played. After another increment of movement of the cam shaft 49 to position q, the tone arm 90 is allowed to descend, depositing the needle 92 of the reproducer 91 within the outermost extremity of the playing groove of said record, or within the spiral groove leading to said playing groove. The playing of the record is thus inaugurated. After another small increment of rotation of the cam shaft 49 to the starting position a the pawl mechanism 49 is moved out of cooperative relationship with the ratchet disk 64, whereby the driving relationship between said ratchet disk 64 and the pawl disk 54 is interrupted. The playing of the record will continue until the tone arm 90 or the stylus bar 162 has been moved toward the axis of rotation of the platen 38 a sufficient distance to again release the pawl mechanism 55, or until said pawl mechanism has been released by movement of the rejecting mechanism operated by the button 173. Either of these operations will start a new cycle.

Referring to Figure 1, the numeral 198 indicates a switch operating member for controlling the energization of the motor 32, the numeral 199 indicates a volume control and the numeral 200 indicates a speed control for said motor 32.

The operation of the instrumentalities for carrying out the cycle above outlined will now be described. Starting out at the same point at which the discussion of Figure 27 was started, let it be assumed that the motor 32 is energized, which, through the driving spiral 138, driven spiral 139, shaft 150, worm 151 and worm wheel 67, drives the sleeve 65, which sleeve has fast thereto the ratchet disk 64. The pawl disk 54 adjacent to said ratchet disk 64 carries the pawl mechanism 55, which, while the record is being played, is held out of cooperative relationship with the ratchet disk 64 by means of the setscrew 157 (Fig. 4) carried by the lever 156. Under these conditions, therefore, the pawl disk 54 and the cam shaft 49 are still. Under these conditions the needle 92 carried by the tone arm 90 is traversing the playing groove of a record and will ultimately set instrumentalities into operation to trip said lever 156. The instrumentalities for tripping the lever 156 will be referred to presently. At this time it may be stated briefly that the lever 156 is tripped either in response to the completion of the playing of a record or in response to operation of the rod 174 responsive to the rejecting button 173. Assuming, therefore, that the lever 156 (Fig. 4) has been tripped, the pawl mechanism 55 will be allowed to swing about the axis of the pin 58 (Fig. 13), whereby the member 56 of the pawl mechanism 55 will be abutted by the toothed periphery of the ratchet disk 64. As will be clear from an inspection of Figure 13, movement of the ratchet disk 64 will be communicated to the pawl mechanism 55. Inasmuch as said pawl mechanism 55 is carried by the pawl disk 54, a corresponding movement of rotation will be communicated to said pawl disk 54. The inauguration of the driving relationship between the ratchet disk 64 and the pawl disk 54 starts the cycle outlined in Figure 27 and discussed briefly above. It will be noted that the pawl disk 54 includes the cam groove B, which cam groove receives the roller 111 (Fig. 10), which controls the tone arm bracket 93, which tone arm bracket is adapted to be lifted about the axis of the rod 105. The net result of the action of the cam groove B and roller 111 is to communicate a lifting movement to the tone arm 90, (position b, Figure 27).

Under normal conditions the cam E is pinned to cam C (Figs. 4 and 21). Inasmuch as cam C is fast to the cam shaft 49, the result is that cam E is operative (when cam shaft 49 is rotating) to control the lever 130 (Fig. 6), which lever is provided with the arms 43—43 which control the pads 42—42. When the cam E rotates to a position wherein the high part of said cam starts to operate the roller 129 carried by lever 130, the platen 38 starts its upward movement, the clutching relationship between clutch elements 35 and 36 is interrupted, and the pads 42—42 become effective as brake members to stop rotation of the platen 38, (position c, Figure 27). At this time the dividing plates 80—80 are in withdrawn position. By reference to Figure 14 it will be noted that said dividing plates are responsive to the cam G, which cam is secured to the sleeve 69 (Fig. 4), which sleeve 69 has the cam E fast thereto. It will be clear, therefore, that the raising and the stoppage of rotation of the platen 38 is accompanied by the withdrawal of the dividing plates 80—80, allowing the lowermost of the pile of records within the reservoir 70 (Figs. 2 and 8) to rest upon the drop bottom 71 of said reservoir 70. The outermost positions of said dividing plates 80—80 correspond with position d of the cam shaft 49. After the cam shaft 49, according to the diagram shown in Figure 27, has rotated through an angle of about 80 degrees, from its starting position, the cam groove B in cooperation with roller 111 (Fig. 10) will have raised the tone arm 90 to the limit of its movement in an upward direction, (position e, Figure 27). At this time cam A, which is carried by the cam shaft 49, will, through its cooperation with roller 114 and lever 112 (Fig. 3), cause the swinging movement of the tone arm bracket 93 about the axis of the shaft 97 (Fig. 10), swinging said tone arm outwardly toward and past the periphery of the record which has just been played. The swinging brake member 109 is operative during the outermost portion of the swinging movement of tone arm 90 to frictionally hold said tone arm.

Shortly after the tone arm has started outwardly (position f, Figure 27) mechanism will be operative for lifting the center pin 113. The mechanism referred to includes cam G, which is fast to the sleeve 69. By reference to Figure 4 it will be noted that said cam G cooperates with the roller 128 to control the lever 118, which lever controls movement of the sleeve 115, which houses the center pin 113. The rotation of cam shaft 49 will therefore, through the cam G, result in lifting the center pin 113. By reason of the actions referred to, the platen 38 will have been raised to the limit of its upward movement and the center 113 will have been raised to the limit of its upward movement, (position g, Figure 27). In a certain practical embodiment of the present invention the range of movement of the platen has been approximately ¼ of an inch; that is to say, the upper position of the platen 38 has been chosen as about ¼ of an inch above the normal playing position of said platen. Under these conditions the record upon said platen 38 may slide off, said platen having been raised a sufficient distance to clear the centering pins 134—134 disposed at the lower side of said platen 38. By reference to Figure 1 it will be noted that the sill 133 is disposed in position to guide each record in succession as it slides from the platen 38. Said sill 133 will prevent scraping of the sliding record against the centering pins 134—134 at the lower side of the playing platen 38 and will direct the sliding record safely into the storage space 30.

The illustrated embodiment of the present invention contemplates means which after the played record has had an opportunity to slide from the platen 38 will cause the depositing of a new record upon said platen 38. This action is responsive to the cam F, which, as will be noted from an inspection of Figure 8, controls the drop bottom 71 of the reservoir 70. Inasmuch as the dividing plates (Fig. 14) are controlled by the cranking action of the crank pin 99 carried by the cam G, it will be clear that the dividing plates are moved inwardly from the time at which they reached their fully withdrawn positions. Therefore, at the time that the drop bottom 71 starts down, (position h, Figure 27), said dividing plates 80—80 are almost, if not quite, at their innermost positions. In any case, said dividing plates 80—80 will be sufficiently close to their innermost positions to hold the next to the lowermost record in the reservoir 70 against sliding out of said reservoir 70. The innermost positions of the dividing plates 80—80 correspond to position i of the cam shaft 49. At the time that the drop bottom 71 starts downwardly, cam E will control lever 130 (Fig. 6) to allow the platen 38 to drop to an intermediate position, which in the practical embodiment of the present invention above referred to has been chosen as about 1/16 of an inch below the fully raised position of said platen 38, which is to say—about 1/16 of an inch above the normal playing position of said platen 38. As the drop bottom 71 descends, the lowermost record within the reservoir 70 will slide out from said reservoir 70 onto the platen 38. Inasmuch as said platen 38 is in slightly raised position, that is—with the clutching elements 35 and 36 out of cooperative relationship with each other, (being held in said position through the medium of the brake pads 42—42), said platen 38 will be motionless. It may be stated at this time that inasmuch as the platen 38 is down in its intermediate position, only 1/16 of an inch above its normal playing position, the record which has slid from the reservoir 70 will be stopped by the centering pin 134—134 disposed at the lower side of the platen 38 (Figs. 2 and 3). After the cam shaft 49 has rotated through its cycle of operation a sufficient distance to allow the drop bottom 71 to deliver a new record to the platen 38, the centering pins 134 will be operated to center said new record (position j, Figure 27), and the center pin 113 will start downwardly to seat itself within the central aperture commonly provided in disk records. The centering pins are controlled by cam C and by the long spring 145. By reference to Figure 6 it will be noted that said cam C cooperates with the roller 144 carried by the lever 143, which, through the link 142, controls the annular member 140 (Fig. 2). Said annular member 140 has pivoted thereto the arms carrying the centering pins 134—134. Said long spring 145 normally biases the annular member 140 in a clockwise direction as the parts are viewed in Figure 5, tending to move the centering pins 134 toward the axis of rotation of the platen 38. When a high part of the cam C is in engagement with the roller 144 (Fig. 6), the centering pins 134—134 will be held outwardly. Said cam C is operative at the time that a record slides upon the platen 38 to hold the pins 134 outwardly against the tension of the spring 145. As the cam shaft 49 rotates, said spring 145 is allowed to move said centering pins 134 inwardly to center the record. By reason of this action, records of different sizes may be centered with a resilient action without any danger of breakage. By reason of the fact that the spring 145 is a long spring, records of widely differing sizes may be accommodated.

By reference to Figure 2 it will be noted that the arm 139 carrying one of the centering pins 134 is provided with the setscrew 147. Said setscrew is adapted to abut against the side of the reproducer 91 carried by the tone arm 90 and will move said reproducer 91 toward the axis of the platen 38 against the friction of the swinging member 109 to a position to engage the needle receiving groove of the record upon the platen 38. It will be understood, of course, that the setscrew 147 may be so set that when the centering pins 134—134 are in engagement with the periphery of the record upon platen 38, the reproducer 91 will be so positioned that the needle 92 of said reproducer 91 will be directly above the outermost portion of the needle receiving groove of said record. The outer margin between the external diameter of the needle receiving groove and the periphery of a record does not vary much among records encountered in practice. Moreover, most records have a groove leading in to the external terminus of the playing groove, which leading in groove provides a certain amount of space radially of the record within which the needle 92 may deposit itself before the needle enters the playing groove. Moreover, as indicated above, the tone arm with its attached parts need not be perfectly balanced by the counterweight 102, so that the tone arm 90 with its associated parts may have a natural tendency to swing toward the axis of the platen 38. In this case, the setscrew 147 may be set to locate the needle 92 of the reproducer 91 anywhere within a relatively broad band at the periphery of the record.

As the centering pins 134—134 start to move toward the axis of rotation of the platen 38, the center 113 starts downward under the influence of cam G. After a record has been allowed to slide out from the reservoir 70, the drop bottom 71 of said reservoir 70 will be closed by reason of the action of the cam F, (position k, Figure 27). It will be remembered that the tone arm 10 has been moved outwardly after having been lifted from the record previously played, the outward movement of the tone arm having been in response to the movement of cam A. The tone arm 90 may now start to descend to playing position, (position l, Figure 27) but should not reach said position until after the centering pins 134 have been moved out of engagement with the periphery of the record upon the platen and after the platen has been started in rotation. The centering pins 134—134 should be allowed to remain in contact with the periphery of the record upon the playing platen 38 until the center 113 is fully down, (position m, Figure 27). The present invention contemplates a period of dwell to insure that the center 113 is down before the centering pins 134—134 start outwardly, (position n, Figure 27). After the centering pins 134—134 have been moved fully outwardly by the action of cam C, (position o, Figure 27), the lever 130 (Fig. 6) will be allowed to swing in a counter-clockwise direction by the cam E to establish a driving relationship between the clutch elements 35 and 36 (the clutch element 35 being connected to the motor shaft 34), (position p, Figure 27). Such counter-clockwise movement of the lever 130 will also allow the pads 42—42 to withdraw from braking relationship with the under side of the platen 38. The platen 38 will therefore be rotated. After the platen 38 has been given an opportunity to gather headway, the tone arm 90 is allowed to descend by reason of the contour of cam groove B, which receives the roller 111 (Fig. 10), (position q, Figure 27). The descent of the tone arm 90 into operative relationship with the record upon the platen 38 results from a swinging movement of the tone arm bracket 93 about the axis of the rod 105. The playing of the record upon the platen 38 is thereby started, and in accordance with common practice the playing groove of said record will conduct the tone arm 90 toward the axis of rotation of said platen 38.

As the pawl disk 54 rotates, the member 57 of the pawl mechanism 55 will of course be moved out of adjacency with the setscrew 157 carried by the lever 156. Said lever 156 is biased in a counter-clockwise direction as the parts are viewed in Figures 4 and 12, said biasing being accomplished by the spring 157a (Fig. 12). Under the influence of the spring 157a the setscrew 157 will be urged to a position whereby when the pawl disk 64 has nearly completed one revolution, the member 57 of the pawl mechanism 55 will ride over said setscrew 157. The inner surface of the member 57 is curved, so that said setscrew 157 will move the member 57 outwardly, and with it will move the member 56 outwardly, thereby disengaging the pawl disk 54 from the ratchet disk 64. Figure 13 shows the parts in the positions assumed after the pawl mechanism has been removed from engaging relationship with the ratchet disk 64.

The playing of the record which has been inserted upon the platen 38 will be continued until said playing has been stopped, by certain instrumentalities which will now be referred to. Inasmuch as the needle 92 carried by the tone arm 90 is disposed within the playing groove of the record, said tone arm 90, in accordance with the usual practice, will be positively moved toward the axis of rotation of the platen 39. The present invention provides mechanism for stopping the rotation of the platen 38 when the tone arm 90 has been swung to a predetermined position adjacent to the axis of rotation of said platen 38. The mechanism for automatically causing the stoppage of rotation of the platen 38 is shown in Figures 10, 11 and 12. As indicated above, a number of records encountered in service provide special grooves at the inner terminus of the playing groove for cooperating with certain phonograph stopping mechanism. Certain records encountered in service employ a spiral groove at the inner terminus of the playing groove, which spiral groove is quite steep and which swings the tone arm with a rapid movement toward the axis of rotation of the platen after the playing groove has been completely traversed. Other records encountered in service provide an elliptical groove at the inner terminus of the playing groove, the elliptical groove having the effect of moving the tone arm toward the axis of rotation of the platen after the playing groove has been completely traversed and thereafter reversing the movement of said tone arm, moving said tone arm away from the axis of rotation of the platen. The elliptical groove may or may not carry the tone arm sufficiently close to the axis of rotation of the platen 38 to inaugurate the cycle of operation of the cam shaft 49.

The present invention contemplates means for positively tripping the lever 156 and inaugurating the cycle of operation of the cam shaft 49 regardless of the type of groove, if any, leading from the inner terminus of the playing groove of a disk record. By reference to Figure 11 it will be noted that the drum 66 provided with the peripheral spiral groove is adapted to be engaged by the stylus 164 of the stylus bar 162. During the playing of a record, said stylus 164 is held out of engagement with the drum 66 by reason of the fact that the lateral extension 165 of the stylus bar 164 is resting upon the shelf 167 (Figs. 11 and 12). Said drum 66 is fast to the sleeve 65, which is rotating at all times that the motor 32 is energized. By adjustment of the setscrew 171, the arm 159 attached to the tone arm bracket 93 may be caused to release the stylus bar 162 from its supported position at any predetermined distance from the axis of rotation of the platen 38. In practice this distance will be selected to correspond to the record having the largest internal diameter of needle receiving groove to be encountered; that is to say, the setscrew 171 will be so set that it will be engaged by the member 159 when the needle 92 carried by the tone arm 90 fast to the tone arm bracket 93 is at or close to the inner extremity of the needle receiving groove having the largest diameter to be encountered; or, if preferred, the setscrew 171 may be set to meet the needs of the particular user of the machine, who may not have within his collection of records any records having a particularly large internal diameter of needle receiving groove. In that case the setscrew 171 will be so set that said setscrew will be engaged by the member 159 when the needle 92 carried by the tone arm 90 attached to the tone arm bracket 93 is at or close to the innermost portion of the needle receiving groove of the record having the largest internal diameter of needle receiving groove among the records to be played by that particular user. The drum 66, being secured to the sleeve 65, is rotated during all of the time that the motor 32 is energized. Consequently, when the stylus bar 164 is released from the shelf 167 and the stylus 164 has been allowed to drop into engagement with the spiral groove of the drum 66, said stylus 164 will be positively moved in a clockwise direction as the parts are viewed in Figure 11, following the spiral groove on the drum 66. The setscrew 172 will be so set that said setscrew will be engaged by the extremity of the lateral extension 165 at the moment when the needle 92 carried by the tone arm 90 attached to the tone arm bracket 93 is in a position corresponding to the innermost extremity of the smallest playing groove encountered (a) in ordinary practice, or (b) among the particular records within the repertory of the particular user for whom the setting of the setscrew 172 is made. By setting the setscrew 171 to cause the removal of the lateral extension 165 from the self 167 to correspond with the largest internal diameter of groove to be encountered, and by setting the setscrew 172 to be engaged by said lateral extension 165 at a position corresponding to the smallest internal diameter of playing groove to be encountered, the result is assured that lever 156 will be tripped at or after the complete traversal of the playing groove having the largest internal diameter which will be encountered. Tripping of said lever 156 will always occur at a position corresponding to the innermost extremity of the playing groove having the smallest internal diameter.

As indicated above, certain records found in practice have a spiral groove leading from the inner terminus of the playing groove, which spiral groove has a relatively steep pitch, said groove of steep pitch being provided for the purpose of moving the tone arm inwardly at a rapid rate to cooperate with certain record stopping mechanism. Other types of records have an elliptical groove starting from the inner terminus of the playing groove to cooperate with certain phonograph stopping mechanism. Other records are provided with other types of groove. Said special grooves may utilized in the practice of the present invention for effecting a rapid action in tripping the lever 156 to inaugurate the cycle of operation of the cam shaft 49. The extremity 160 of the member 159 attached to the tone arm bracket 93 is utilized in accomplishing the rapid action referred to. If the playing groove or the special groove leading from the inner terminus of the playing groove of a record should carry the tone arm 90 and consequently the tone arm bracket 93 sufficiently far in a clockwise direction (Fig. 11) to cause the extremity 160 to engage setscrew 161, the lever 156 will be tripped directly by means of said extremity 160. A certain amount of time will be saved by the direct action of the extremity 160 of member 159 against setscrew 161 over the action of the spiral drum 66 in moving the stylus bar 164 to a position wherein the lateral extension 165 thereof engages the setscrew 161 to trip the lever 156. As stated above, the tripping of the lever 156 releases the pawl mechanism 55 (Figs. 4 and 13) to inaugurate the cycle of the cam shaft 49. In the cycle of the cam shaft 49 it will be remembered that the tone arm bracket is swung to lift the tone arm from cooperative relationship with the record which has been played. Moreover, said tone arm bracket is swung to move the tone arm outwardly. During this outward movement the shoulder 170 carried by the member 159 will engage the outer extremity of the lateral extension 165 of the stylus bar 162, moving same back upon the shelf 167.

The means for rejecting a record during the playing thereof and causing the delivery to the platen 38 of a new record to be played will be clear from the description hereinabove. It need only be stated that if the operator desires to reject a record while it is being played, he may push on the push button 173 (Figs. 1 and 4), which will move the rod 174 (Fig. 4) to trip the lever 156, causing the pawl mechanism 55 to clutch together the pawl disk 54 and ratchet disk 64, whereby the cycle of operation of cam shaft 49 will be inaugurated to raise the tone arm, move same outwardly, discharge the record from the platen 38, deliver a new record from the reservoir 70, center said new record and start the playing thereof.

When it is desired to repeat the playing of a record for one replaying operation thereof, the turn button 182 (Figs. 1, 23 and 24) will be turned to correspond to the letter R (Fig. 1). This will operate the swinging plate 184 to cause the leg 193 of said plate 184 to retract the spring-pressed pin 153 from cam E, thereby disconnecting cam E and its sleeve 69 with cams F and G from operative relationship with the cam shaft 49. Therefore, until the cam C completes its revolution, the mechanisms controlled by cams E, F and G will be inoperative. As noted above, cam E controls the driving connection between the motor and the platen, cam F controls the feed of records successively from the reservoir 70 to the platen and cam G controls the center 113 of the playing platen and the dividing plates 80—80. It is desirable in repeating the playing of a record to control the driving connection between the motor 32 and the platen 38, and for this purpose the cam D is provided on the cam C, which is adapted (Fig. 6) to control the lever 130 through the medium of the roller 198 to operate the pads 92 to lift the platen 38 a small amount to declutch said platen from the shaft 34 of the driving motor 32 and to bring said platen 38 to a stop. By reason of the stoppage of movement of the platen 38, no interference is had between said platen and the centering pins 134—134. Inasmuch as cams F and G are inoperative during one revolution of the cam shaft 49 when turn button 182 has been turned to repeat position, and inasmuch as the platen 38 is not lifted at this time a sufficient distance to clear the centering pins 134, there will be no discharge of the record from the platen 38 and no delivery of a new record to said platen from the reservoir 70. However, aside from these functions, the cam shaft 49 will go through its cycle of movement and the spring-pressed pin 153 will snap into the socket 155 (Fig. 21) to again connect cam E, sleeve 69 and cams F and G in operative relationship with the cam C and cam shaft 49. When the operator desires to repeat the playing of a record indefinitely, he will swing the turn button 182 to the position C (Fig. 1), which will move the leg 194 of the plate 184 into position to withdraw the spring-pressed pin 153 from cam E. By reason of the releasable connection between the indicating finger 185 with the round heads of the pin 191, the swinging plate 184 will be held in the position indicated by the letter C (Figure 1). During successive revolutions of the cam shaft 49, stud 192 will engage the beveled edge 197 of the leg 194 of plate 184, preventing the snapping of pin 153 into its socket 155. Therefore, as long as the turn button 182 is in position C (Fig. 1), cams E, F and G will be disconnected from driving relationship with the cam shaft 49 and will be inoperative to discharge the record from the paten 38 and to deliver a new record to said platen from the reservoir 70. If the operator should desire to manually remove records from the playing platen 38 and to manually mount records upon said platen 38, he will do so when the turn button 182 (Fig. 1) is turned to position C. Each time during the cycle of the cam shaft 49 that the center pin 113 is withdrawn and the tone arm 90 is lifted, the operator may remove the played record and insert a new record. As the cycle of movement of the cam shaft 49 progresses, the tone arm will be automatically moved to playing position and will start the playing of the new record.

The present invention covers a structure which involves no expensive parts and which is not likely to get out of order. It is positive in its action and is operative to play, in their entirety, a magazine of records of widely varying sizes and types.

Though a preferred embodiment of the present invention has been described in detail, many modifications will occur to those skilled in the art. It is intended to cover all such modifications that fall within the scope of the appended claims.

What is claimed is—

1. In a phonograph, in combination, a rotatable platen having its axis inclined to the horizontal, a tone arm adapted to swing across said platen, means responsive to movement of said tone arm toward the axis of said platen for lifting said tone arm and moving said tone arm across said platen, and flexible brake means cooperating with said tone arm for holding said tone arm against swinging movement while said tone arm is in lifted and outermost position.

2. In a phonograph, in combination, a rotatable platen having its axis inclined to the horizontal, a tone arm adapted to swing across said platen, means responsive to movement of said tone arm toward the axis of said platen for lifting said tone arm and moving said tone arm across said platen, flexible brake means cooperating with said tone arm for holding said tone arm against swinging movement while said tone arm is in lifted and outermost position a tone arm bracket, said tone arm being a pendent member and pivoted to said bracket, and an adjustable counterbalancing means carried by said bracket for modifying the pendent action of said tone arm.

3. In combination, a phonograph platen having its axis inclined to the vertical, a tone arm, mounting means for said tone arm for swinging action of said tone arm transversely to the plane of said platen and across the face of said platen, a tone arm bracket, said tone arm being a pendant member and pivoted to said bracket, and adjustable counterbalancing means carried by said bracket for modifying the pendant action of said tone arm.

4. In combination, a phonograph platen, a center pin axially movable relative to and rotatable with said platen, mounting means for said center pin, resilient means for urging said center pin into cooperative relationship with said platen and substantially radially movable means adapted to cooperate with the periphery of a record to center the record on said platen.

5. In combination, a phonograph platen, the normal axis of rotation of which is inclined to the vertical, a center pin axially movable relative to and rotatable with said platen, means for resiliently urging said center pin into cooperation with said platen, and means for raising said center pin out of contact with said platen whereby to permit a record upon said platen to slide therefrom.

6. In combination, a phonograph platen having its axis inclined to the vertical, a center pin axially movable relative to and located above said platen, and means for causing relative axial movement of said platen and said center pin.

7. In combination, a phonograph platen having its axis inclined to the vertical, a center pin axially movable relative to said platen, centering means engageable with the periphery of a record for centering a record on said platen, a tone arm and means responsive to the position of said tone arm for causing relative axial movement of said platen and said center pin.

8. In combination, a phonograph platen having its axis inclined to the vertical, a center pin axially movable relative to and rotatable with said platen, centering means engageable with the periphery of the record for centering a record on said platen, and means for causing relative axial movement of said platen and said center pin.

9. In combination, a phonograph platen having its axis inclined to the vertical, a center pin axially movable relative to and rotatable with said platen, a tone arm, centering means engageable with the periphery of a record for centering a record on said platen, and means responsive to the position of said tone arm for causing relative axial movement of said platen and said center pin.

10. In combination, a phonograph platen adapted to carry a disk record having a central aperture, an axially movable center pin, said center pin being rotatably mounted whereby said center pin may rotate with said platen, resilient means for urging said center pin into cooperative relationship with said platen, means for inserting records of different sizes on said platen, and means for lifting said center pin out of cooperative relationship with said platen, said platen having its normal axis of rotation inclined to the vertical whereby when said center pin is lifted out of cooperative relationship with said platen a record on said platen may slide off.

11. In combination, in a phonograph, a driving motor, a driving clutch element connected to said motor, a driven clutch element adapted to cooperate with said driving clutch element, a platen secured to said driven clutch element and adapted by gravity to bias said driven clutch element into cooperative relationship with said driving clutch element, and brake means for said platen adapted to lift said platen to disconnect said clutch elements.

12. In combination, a platen, a driving motor, a clutch between said platen and said motor, said clutch being biased to clutching position by the weight of said platen, means for lifting said platen to render said clutch inoperative and centering means disposed about the periphery of said platen, and adapted to center a record upon said platen, said platen having its axis of rotation inclined to the vertical, the range of lifting action of said platen being sufficient to allow a record upon said platen to clear said centering means when said platen is in fully raised position.

13. In combination, a platen, a driving motor, a clutch between said platen and said motor, said clutch being biased to clutching position by the weight of said platen, and means for lifting said platen to render said clutch inoperative, said lifting means including braking means for stopping rotation of said platen when said platen is in lifted position, and centering means disposed about the periphery of said platen and adapted to center a record upon said platen, said platen having its axis of rotation inclined to the vertical, the range of lifting action of said platen being sufficient to allow a record upon said platen to clear said centering means when said platen is in fully raised position.

14. In combination, a rotatable platen, said platen being capable of axial movement, driving means for said platen, means for lifting said platen axially and rendering inoperative said driving means, a center pin, said platen and said center pin being relatively movable axially, centering means disposed about the periphery of said platen, the axis of rotation of said platen being inclined to the vertical and the range of lift of said platen being sufficient so that when said center pin is lifted a record upon said platen may slide therefrom and clear said centering means.

15. In combination, a phonograph platen having its normal axis of rotation inclined to the vertical, a plurality of upstanding members spaced about the periphery of said platen and extending upwardly beyond the plane of the upper face of said platen, biasing means for urging said upstanding members toward the axis of rotation of said platen, and means for lifting said platen to a level such that a record upon said platen may in sliding from said platen clear said upstanding members.

16. In combination, a phonograph platen having its axis inclined to the vertical, upstanding members spaced around the periphery of said platen, biasing means for urging said upstanding members toward the axis of rotation of said platen, means for controlling the axial position of said platen, means for delivering a record to said platen when said platen is in a predetermined axial position, and means for controlling said biasing means whereby said upstanding members may center said record upon said platen while said platen is in said predetermined axial position.

17. In combination, a phonograph platen having its axis inclined to the vertical, means for delivering records thereto by gravity, means for centering said records upon said platen, driving means for said platen, said driving means including clutch means responsive to the axial position of said platen, and means for controlling the axial position of said platen.

18. In combination, a phonograph platen having its axis inclined to the vertical, means for delivering records thereto by gravity, means for centering said records upon said platen, driving means for said platen, said driving means including clutch means responsive to the axial position of said platen, and means for controlling the axial position of said platen, said controlling means including brake means for stopping rotation of said platen when said platen is in a predetermined axial position.

19. In combination, a phonograph platen having its normal axis of rotation inclined to the vertical, means for delivering records in succession to said platen by gravity, centering means cooperating with the peripheries of said records for centering said records of different sizes upon said platen, a center pin adapted to cooperate with said platen and means for causing relative axial movement of said center pin and said platen whereby to release said records from said platen.

20. In combination, a phonograph platen having its normal axis of rotation inclined to the vertical, means for delivering records in succession to said platen by gravity, centering means cooperating with the peripheries of said records for centering records of different sizes upon said platen, a center pin adapted to cooperate with said platen, and means for causing relative axial movement of said center pin and said platen whereby to release said records from said platen, said center pin being rotatable whereby when said center pin is in cooperative relationship with said platen, said center pin, said platen and a record upon said platen may rotate as a unit.

21. In a phonograph, in combination, driving means, a cam shaft adapted to be connected to said driving means, cam members adapted to be driven by said cam shaft, a platen adapted to be driven by said driving means, said platen having its axis inclined to the vertical, a reservoir for records, means responsive to said cam members for successively releasing records from said reservoir to gravitate to said platen, means for centering said records successively upon said platen, and means for releasing said records from said platen in succession and to control the driving relationship between said driving means and said platen.

22. In a phonograph, in combination, driving means, a cam shaft adapted to be connected to said driving means, cam members adapted to be driven by said cam shaft, a platen adapted to be driven by said driving means, said platen having its axis inclined to the vertical, a reservoir for records, means responsive to said cam members for successively releasing records from said reservoir to gravitate to said platen, means responsive to said cam members for centering said records successively upon said platen and to release said records from said platen in succession and to control the driving relationship between said driving means and said platen, a tone arm cooperating with said platen, and means responsive to the position of said tone arm for governing the connection between said driving means and said cam shaft.

23. In combination, a rotatable phonograph platen having its normal axis of rotation inclined to the vertical, a master control member, driving means for said platen and for said master control member, a tone arm adapted to cooperate with said platen, means responsive to the position of said tone arm for controlling the connection between said driving means and said master control member, a reservoir for records, means responsive to operation of said master control member for controlling the supply of records from said reservoir in succession to said platen, the driving relationship between said driving means and said platen and the discharge of said records in succession from said platen and means for centering records of different sizes on said platen.

24. In a phonograph, in combination, a rotatable platen having its axis of rotation inclined to the vertical, a reservoir for records, a master control member, means controlled by said master control member for controlling the delivery of records from said reservoir in succession by gravity to said platen, means controlled by said master control member for starting and stopping of said platen, means for holding a record on said platen, means for discharging said records in succession from said platen, a tone arm cooperating with said platen, and means responsive to movement of said tone arm for governing said master control member.

25. In combination, a phonograph platen, a center pin therefor, means for resiliently urging said center pin into co-operative relationship with said platen, means for lifting said center pin clear of said platen, and contractable centering means adapted to cooperate with the periphery of a record to center said record upon said platen.

26. In combination, a phonograph platen, a center pin therefor, means for resiliently urging said center pin into cooperative relationship with said platen, means for lifting said center pin clear of said platen, centering means adapted to cooperate with the periphery of a record to center said record upon said platen, and a tone arm cooperating with said platen, said centering means being provided with a member for positioning said tone arm in response to the operation of said centering means.

27. In a phonograph, in combination, a normally inclined and axially movable platen, means for controlling the discharge of records therefrom, centering means adapted to cooperate with the periphery of the record for centering a record on said platen, means for actuating said platen axially for discharging the records over said centering means, a master control member for controlling said means, driving means for said master control member, means for connecting said driving means to said master control member, said connecting means being biased to operative position, abutment means for holding said connecting means out of operative position, a tone arm cooperating with said platen, and means responsive to the position of said tone arm for moving said abutment member to permit said connecting means to move to operative position.

28. In a phonograph, in combination, a rotatable platen, a tone arm adapted to swing across the face of said platen, driving means for said platen, means for interrupting the driving relationship between said driving means and said platen, means for controlling said interrupting means, said controlling means being driven by said driving means and including a spiral member, a follower adapted to cooperate with said spiral member, means for holding said follower out of cooperative relationship with said spiral member, and adjustable means responsive to the position of said tone arm for controlling the relationship between said follower and said spiral member.

29. In combination, a phonograph platen, driving means for said platen, a tone arm adapted to cooperate with said platen and having a swinging movement across said platen, means for controlling the driving relationship between said driving means and said platen, said controlling means including a spiral member and a follower therefor, means for holding said follower out of cooperative relationship with said spiral member, said tone arm being provided with means operative in the swinging movement of said tone arm toward the axis of said platen for moving said follower into cooperative relationship with said spiral member and means for varying the time for effecting the cooperative relationship between said follower and spiral member.

30. In combination, a phonograph platen, a tone arm capable of a swinging movement across the face of said platen, means for driving said platen, a trip member carried by said tone arm, a control member for interrupting the driving relationship between said driving means and said platen, knock-off means for rendering said control means operative, operating means for said knock-off means, said operating means including a spiral member and a follower adapted to cooperate therewith, and means associated with said follower and momentarily engaged by said trip member for connecting said follower with said spiral.

31. In a phonograph, in combination, a platen, means for controlling the stoppage of said platen, said means including a rotatable drum having a spiral groove thereon, a stylus adapted to engage said groove, a sill for holding said stylus out of engagement with said drum, a tone arm adapted to swing across the face of said platen, and means responsive to said swinging movement of said tone arm for instant disengagement of said stylus from said sill and causing said stylus to engage said groove.

32. In a phonograph, in combination, a platen, a tone arm cooperating with said platen and adapted to swing across the face of said platen, means for controlling the stoppage of said platen, said means including a spiral member, and a follower, said tone arm being provided with means for directly operating said controlling means, means carried by said tone arm and momentarily contacting with said follower for controlling the connection of said follower with said spiral member.

33. In a phonograph, in combination, a rotatable platen, a tone arm mounted to swing across the face of said platen, driving means for said platen, a control member for controlling the operativeness of said driving means in driving said platen, means for connecting said control member to said driving means, said connecting means being normally inoperative, manual means for rendering said connecting means operative and automatic means for rendering said connecting means operative, said automatic means including a spiral member, a follower, and means carried by said follower and momentarily actuated by and through the swinging movement of said tone arm for controlling the connection between said follower and said spiral member.

34. In a phonograph, in combination, a platen, driving means for said platen, a reservoir for records, a master control, means operatively connected to said master control for controlling the delivery of a record from said reservoir to said platen, to control the stopping and starting of said platen and to control the discharge of a record from said platen, a movable member connected to said driving means, a follower for said movable member, a lug for normally holding said follower out of engagement with said movable member said movable member being adapted to engage said master control means to render same operative, and means associated with said tone arm and engageable with said follower for controlling the connection between said follower and said movable member and returning follower to said holding lug.

35. In a phonograph, in combination, a rotatable platen, drive means for said platen, master control means adapted to be driven by said drive means, clutch mechanism for controlling the driving relationship between said drive means and said master control member, said clutch mechanism including pawl mechanism biased into clutching relationship with said drive means and said master control member, said pawl mechanism being rotatable with said master control member, holding means biased to a position to hold said pawl mechanism out of operative clutching relationship with said drive means and said master control member, a tone arm adapted to swing across said platen, means responsive to swinging movement of said tone arm for moving said holding member out of holding relationship with said pawl mechanism, said pawl mechanism being adapted to engage said holding member upon the completion of one revolution of said master control member whereby said holding member when in its biased position will move said pawl mechanism out of the clutching relationship referred to, control mechanism responsive to operation of said master control member for lifting and swinging said tone arm to a position adjacent to the periphery of said platen, control mechanism responsive to operation of said master control member for centering a record upon said platen, control mechanism responsive to operation of said master control member for lifting said platen and for controlling the operative connection between said drive means and said platen, auxiliary control mechanism for controlling the starting and stopping of said platen, a center pin movable axially of said platen, control mechanism responsive to movement of said master control member for moving said center pin out of cooperative relationship with said platen, and control mechanism responsive to operation of said master control member for controlling the successive delivery of records to said platen.

36. In a phonograph, in combination, a rotatable platen drive means for said platen, master control means adapted to be driven by said drive means, clutch mechanism for controlling the driving relationship between said drive means and said master control member, said clutch mechanism including pawl mechanism biased into clutching relationship with said drive means and said master control member, said pawl mechanism being rotatable with said master control member, holding means biased to a position to hold said pawl mechanism out of operative clutching relationship with said drive means and said master control member, a tone arm adapted to swing across said platen, means responsive to swinging movement of said tone arm for moving said holding member out of holding relationship with said pawl mechanism, said pawl mechanism being adapted to engage said holding member upon the completion of one revolution of said master control member whereby said holding member when in its biased position will move said pawl mechanism out of the clutching relationship referred to, control mechanism responsive to operation of said master control member for lifting and swinging said tone arm to a position adjacent to the periphery of said platen, control mechanism responsive to operation of said master control member for centering a record upon said platen, control mechanism responsive to operation of said master control member for lifting said platen and for controlling the operative connection between said drive means and said platen, auxiliary control mechanism for controlling the starting and stopping of said platen, a center pin movable axially of said platen, control mechanism responsive to movement of said master control member for moving said center pin out of cooperative relationship with said platen, control mechanism responsive to operation of said master control member for controlling the successive delivery of records to said platen, connecting means for connecting to said master control member said control mechanism for controlling the lifting of said platen and said control mechanism for controlling the successive delivery of records to said platen, and manually operable means for moving and holding said connecting means out of operative position.

37. In a phonograph having a rotatable platen, means for controlling the rotation of said platen and means for positively moving the tone arm of said phonograph in a direction from the axis of said platen toward the periphery thereof, a rotatable master control member, control mechanisms for controlling the successive delivery of records to said platen and the successive discharge of records from said platen, spring-pressed means for connecting said control mechanisms to said master control member, and manually operable means for controlling said spring-pressed member, said manually operable means having a pair of abutting portions adapted to be selectably positioned in obstructing relationship with said spring-pressed member, said manually operable member being provided with means for holding one of said abutment portions in obstructing relationship with said spring-pressed member during successive rotations of said master control member.

38. In combination, a rotatable platen, drive means, a tone arm, a master control member for controlling the connection of said platen to said drive means and the operation of said tone arm, a ratchet member driven by said drive means, a pawl carrying member connected to said master control member, pawl mechanism carried by said pawl carrying member, spring means biasing said pawl mechanism into a position to establish a driving relationship between said ratchet member and said pawl carrying member, means for lifting said platen, means for successively delivering records to said platen, a holding member, means biasing said holding member into a position to lift said pawl mechanism out of engaging relationship with said ratchet member, means responsive to movement of said tone arm in the playing of a record upon said platen for moving said holding member out of holding relationship with said pawl mechanism, said pawl mechanism including an abutment portion and a toothed portion, said abutment portion and toothed portion being resiliently connected together, control mechanism responsive to the operation of said master control member for controlling the successive delivery of records to said platen, connecting means for connecting to said master control member said control mechanism for controlling the lifting of said platen and said control mechanism for controlling the successive delivery of records to said platen, and manually operable means for moving and holding said connecting means out of operative position.

39. In a phonograph, in combination, a rotatable platen, a swinging tone arm, drive means, a master control member, mechanisms responsive to operation of said master control member for stopping said platen and positively lifting said tone arm and moving same across said platen in a direction from the axis of said platen toward the periphery of said platen, other mechanisms controlled by said master control member for controlling the successive delivery of records to said platen, biased means for connecting said other mechanisms to said master control member, and a manually operable member for controlling said biased means, said manually operable member having a pair of abutment portions adapted to be selectably disposed in obstructing relationship with said biased means, said manually operable member having means for releasably holding one of said obstructing portions in said obstructing relationship with said biased means, said manually operable member being adapted to move said other abutment portion out of obstructing relationship with said biased means without manual intervention.

40. In a phonograph, in combination, a rotatable platen, drive means, said platen being adapted to be lifted to control the driving relationship between said drive means and said platen, a master control member, clutching mechanism between said drive means and said master control member, said clutching mechanism including a driving element and a driven element, said clutching mechanism also including connecting means movable with said driven element, said connecting means being adapted to connect together the driven element of said clutching mechanism and said master control member, a holding member for holding said connecting means out of connecting position, a spiral member adapted to be driven by said drive means, a follower for said spiral member, a tone arm, means responsive to the position of said tone arm for controlling the operative relationship between said follower and said spiral member, and means connected to said follower for removing said holding member from holding relationship with said connecting means, said master control member being provided with means for controlling said clutching mechanism.

41. In a phonograph, in combination, a rotatable platen, drive means, said platen being adapted to be lifted to control the driving relationship between said drive means and said platen, a master control member, clutching mechanism between said drive means and said master control member, said clutching mechanism including a driving element and a driven element, said clutching mechanism also including connecting means movable with said driven element, said connecting means being adapted to connect together the driven element of said clutching mechanism and said master control member, a holding member for holding said connecting means out of connecting position, a spiral member adapted to be driven by said drive means, a follower for said spiral member, a tone arm, means responsive to the position of said tone arm for controlling the operative relationship between said follower and said spiral member, means connected to said follower for removing said holding member from holding relationship with said connecting means, said master control member being provided with means for controlling said clutching mechanism, and manually operable means for moving said holding member out of holding relationship with said connecting means.

42. In a phonograph, in combination, a rotatable platen, drive means, said platen being adapted to be lifted to control the driving relationship between said drive means and said platen, a master control member, clutching mechanism between said drive means and said master control member, said clutching mechanism including a driving element and a driven element, said clutching mechanism also including connecting means movable with said driven element, said connecting means being adapted to connect together the driven element of said clutching mechanism and said master control member, a holding member for holding said connecting means out of connecting position, a spiral member adapted to be driven by said drive means, a follower for said spiral member, a tone arm, means responsive to the position of said tone arm for controlling the operative relationship between said follower and said spiral member, and means connected to said follower for removing said holding member from holding relationship with said connecting means, said master control member being provided with means for controlling said clutching mechanism, said tone arm being provided with means movable therewith for directly moving said holding member to move said holding member out of holding relationship with said connecting means.

43. In a phonograph, in combination, a normally inclined rotatable platen, said platen being movable along its axis a tone arm adapted to swing across said platen, a reservoir for records, a master control member, means for driving said master control member, said master control member being provided with mechanisms for controlling the starting and stopping of said platen, means for controlling the movement of said tone arm by said master control member, means for controlling the delivery of records from said reservoir to said platen and means for controlling the discharge of records from said platen by said master control member, and means for establishing an operative connection between said drive means and said master control member responsive to movement of said tone arm.

44. In a phonograph, in combination, a rotatable platen, upstanding members arranged around the periphery of said platen, said upstanding members being biased toward the axis of said platen, master control means for controlling the starting and stopping of said platen, and means responsive to said master control means for moving said upstanding members outwardly.

45. In a phonograph, in combination, a rotatable platen, drive means, clutch means between said drive means and said platen responsive to the lifting of said platen for disconnecting said platen from said drive means, upstanding members disposed around the periphery of said platen, said upstanding members being biased toward the axis of said platen, means for controlling the axial position of said platen, the range of axial movement of said platen being sufficient to allow a record in sliding from said platen to clear said upstanding members, master control means for controlling the lifting of said platen, and means responsive to said master control means for moving said upstanding members outwardly to unbiased positions.

46. In a phonograph, in combination, a rotatable platen, drive means, means for moving said platen axially to control the driving relationship between said drive means and said platen, upstanding members disposed around the periphery of said platen, said platen having its axis of rotation inclined to the vertical, said upstanding members when said platen is in a position intermediate of its range of axial travel being adapted to arrest a record delivered to said platen, said upstanding members being biased toward the axis of said platen, control means for controlling the axial position of said platen, and means responsive to said control means for moving said upstanding members to unbiased positions.

47. In a phonograph, in combination, a rotatable platen, drive means, means for controlling the axial position of said platen to control the driving relationship between said drive means and said platen, a swinging tone arm, master control means for controlling the lifting of said platen and the swinging of said tone arm in a direction away from the axis of said platen toward the periphery of said platen, and upstanding members disposed around the periphery of said platen, said upstanding members being biased toward the axis of said platen and adapted to center a record upon said platen, one of said upstanding members being provided with an abutment for positioning said tone arm in response to movement of said upstanding members.

48. In a phonograph, in combination, a rotatable platen, a tone arm, means for delivering records thereto in succession, means for controlling the starting and stopping of said platen, means for controlling the discharge of records from said platen, a master control member for controlling said means, and dual means for rendering said master control member operative, one of said dual means being directly connected to said tone arm, the other of said dual means including a movable member and a follower therefor, the operative connection between said movable member and said follower being responsive to the position of said tone arm.

49. In a phonograph, in combination, a rotatable platen, a tone arm, means for delivering records thereto in succession, means for controlling the starting and stopping of said platen, means for controlling the discharge of records from said platen, a master control member for controlling said means, and triple means for rendering said master control member operative, one of said triple means being directly connected to said tone arm, another of said triple means including a movable member and a follower therefor, the operative connection between said movable member and said follower being responsive to the position of said tone arm, and the other of said triple means including a manually operable member.

EDWARD A. JOHNSTON.